United States Patent [19]
Brander

[11] 3,797,038
[45] Mar. 12, 1974

[54] DATA OR AUDIO RECORDING AND PLAYBACK APPARATUS

[75] Inventor: Richard Brander, Cicero, Ill.

[73] Assignee: Bettrone Electronics Corporation, Chicago, Ill.

[22] Filed: Apr. 29, 1971

[21] Appl. No.: 138,494

[52] U.S. Cl. .......................... 360/29, 360/46, 360/66
[51] Int. Cl. .......................... G11b 5/44
[58] Field of Search .............. 179/100.2 R, 100.2 K; 340/174.1 G, 174.1 M

[56] References Cited

UNITED STATES PATENTS

| | | | |
|---|---|---|---|
| 2,838,675 | 6/1958 | Wanlass | 340/174.1 G |
| 2,900,215 | 8/1959 | Schoen | 340/174.1 G |
| 3,512,171 | 5/1970 | Hibner | 340/174.1 G |
| 3,009,025 | 11/1961 | Takayanagi et al. | 179/100.2 R |
| 3,280,270 | 10/1966 | Allington | 179/100.2 R |

*Primary Examiner*—Raymond F. Cardillo, Jr.
*Assistant Examiner*—Robert S. Tupper
*Attorney, Agent, or Firm*—Molinare, Allegretti, Newitt & Witcoff

[57] ABSTRACT

Apparatus for recording and playing back either data or audio signals by use of modified pulse width modulation techniques. Triangular-shaped signals produced by a carrier generator are combined with data signals in a modulator to produce width modulated pulses containing data information that are recorded by a record head. Pulses containing audio information are also produced in the foregoing manner. However, the pulses are modified by use of a waveform modifying device that causes the peak value of the current conducted through the record head to vary in proportion to the width of the pulses produced by modulation. Recorded audio signals are picked up by a playback head and passed through an integrating amplifier and a shaper circuit which correct the frequency response characteristic of the record-playback process and reproduce the original audio signals. Recorded pulses containing data information are also played back through the playback head, integrating amplifier and shaper circuit to partially reconstruct the width modulated pulses originally produced for recording purposes. A restoring circuit that reduces the transition time of the partially reconstructed pulses is also employed. The pulses produced by the restoring circuit are filtered by a low pass filter to reproduce the original data signals.

25 Claims, 20 Drawing Figures

INVENTOR.
RICHARD BRANDER
BY
Molinare, Allegretti, Newitt & Witcoff
ATTORNEYS

INVENTOR.
RICHARD BRANDER
BY
Molinare, Allegretti, Newitt & Witcoff
ATTORNEYS

INVENTOR.
RICHARD BRANDER
BY
Molinare, Allegretti, Newitt, & Witcoff
ATTORNEYS

INVENTOR.
RICHARD BRANDER
BY
Molinare, Allegretti, Newitt & Witcoff
ATTORNEYS

INVENTOR.
RICHARD BRANDER
BY
Molinare, Allegretti, Newitt & Witcoff
ATTORNEYS

INVENTOR.
RICHARD BRANDER
BY
Molinare, Allegretti, Newitt & Witcoff
ATTORNEYS

INVENTOR.
RICHARD BRANDER
BY
Molinare, Allegretti, Newitt & Witcoff
ATTORNEYS

OUTPUT FILTER

INVENTOR.
RICHARD BRANDER
BY
Molinare, Allegretti, Newitt & Witcoff
ATTORNEYS

INVENTOR.
RICHARD BRANDER
BY
Molinare, Allegretti, Newitt & Witcoff
ATTORNEYS

DATA OR AUDIO RECORDING AND PLAYBACK APPARATUS

BACKGROUND OF THE INVENTION

This invention relates to recording apparatus and is more particularly directed to recording apparatus employing pulse width modulation techniques.

The successful use of magnetic tape recorders to record and reproduce music and speech has led to the desire to use such recorders to record and reproduce other types of signals, for example, shock and vibration, process variables, system responses, and biological signals such as those developed by the heart, brain, or muscles. In many cases, however, audio recorders are inadequate because of their limited low frequency response and their dependence on the sensitivity and uniformity of the recording medium. This has led to the development of specialized types of recorders for recording such data.

One such type of data recorder employs the pulse width modulation technique to provide a frequency response down to DC, good linearity, low distortion, and independence from the sensitivity and uniformity of the recording medium. These desirable results are achieved at the expense of a reduced bandwidth. Pulse width modulation recorders have been proposed in the past, but each of these devices has exhibited certain deficiencies that have limited its overall usefulness. For example, because the bandwidth of the subject prior art recorders is restricted, they are generally incapable of recording verbal comments from an operator that identify and discuss the data being recorded. In some prior art machines, the foregoing difficulty has been overcome by providing a completely separate recording and playback channel for audio signals. Although this arrangement provides for recording of audio signals, the cost of the overall recorder is significantly increased due to the requisite duplication of circuitry.

Aside from the foregoing deficiency, prior art recorders do not provide an accurate and easily understood indicator that points out to the operator that the level of the signal to be recorded is greater than the recorder can accommodate.

In addition, prior art recorders have not provided a means for driving the record head thereof so that the maximum voltage available from a recorder power supply is used to best advantage. During playback, prior art recorders have also experienced difficulty in reconstructing a pulse signal that closely corresponds to the pulses originally recorded. As a result, prior art recorders have required low pulse rates, and consequently have provided extremely restricted bandwidths.

SUMMARY OF THE INVENTION

Applicant has discovered a technique by which audio signals can be recorded over a wide frequency range by a modified direct recording technique in which most of the circuitry normally associated with pulse width modulation techniques is used. By employing the techniques described herein, the frequency range of audio signals that may be recorded and played back is substantially increased without providing completely separate audio recording apparatus. As a result, the advantages of both pulse width modulated data recording and direct audio recording may be realized in a reliable and inexpensive manner.

During data recording, according to the principal aspect of the invention, data signals are pulse width modulated by use of a generator that produces a carrier signal and a modulator that combines the carrier and data signals in order to produce pulses of varying widths. The pulses are then carried to a novel driver that conducts pulses of current through a record head in a highly efficient and accurate manner, thus recording the pulses on a recording medium. During audio recording, audio signals are pulse width modulated in the manner described, and are carried to the driver. However, before the pulses are conducted through the record head, they are altered by a waveform modifying means that causes the peak value of the current passed through the record head to vary in proportion to the width of the pulses.

During playback, according to the principal aspect of the invention, all signals (i.e., signals containing either data or audio information) are passed through an integrating amplifier and a shaper circuit that serve two functions. If pulses containing data information are being played back, the circuits help to restore the pulses to the same condition in which they were recorded. That is, the circuits help to restore the recorded signals so that they correspond to the pulses originally produced by the modulator. If signals containing audio information are played back, the integrating amplifier and shaper circuit correct the signals for various errors introduced in the recording and playback process (e.g., frequency response). Pulses containing data information are also passed through a restoring circuit that clamps the pulses in a unique manner which enables the circuit to determine the exact width of each pulse as originally recorded. The restoring circuit then generates pulses that accurately correspond to the original pulses produced by the modulator.

Use of the foregoing apparatus results in the recordation of data signals with a degree of accuracy unattainable by using conventional pulse width modulation techniques. Moreover, the apparatus provides a means for economically and accurately recording audio information without substantial duplication of circuitry.

Another aspect of the present invention relates to a novel device capable of providing various indications that accurately descirbe the amplitude or level of a signal to be recorded. Still another aspect of the present invention involves a unique technique for driving a device capable of erasing signals recorded on a recording medium.

DESCRIPTION OF THE DRAWINGS

These and other features and advantages of the present invention will hereinafter appear for purposes of illustration, but not of limitation, in connection with the accompanying drawings in which like numbers refer to like elements throughout, and in which.

DESCRIPTION OF THE PREFERRED EMBODIMENT

1. General Description

A preferred form of a tape recorder made in accordance with the present invention is capable of recording and playing back both data and audio information. (In this regard it should be noted that this invention is capable of recording signals other than audio and data signals. Accordingly, when used herein "data signals" refer to any type of relatively low-frequency signals requiring highly accurate recording and reproduction over a bandwidth extending to zero frequency, and "audio signals" refer to any type of signal having a frequency range or bandwidth normally greater than the data signals and within the range of human hearing, but not extending down to zero frequency.)

Figure 1:
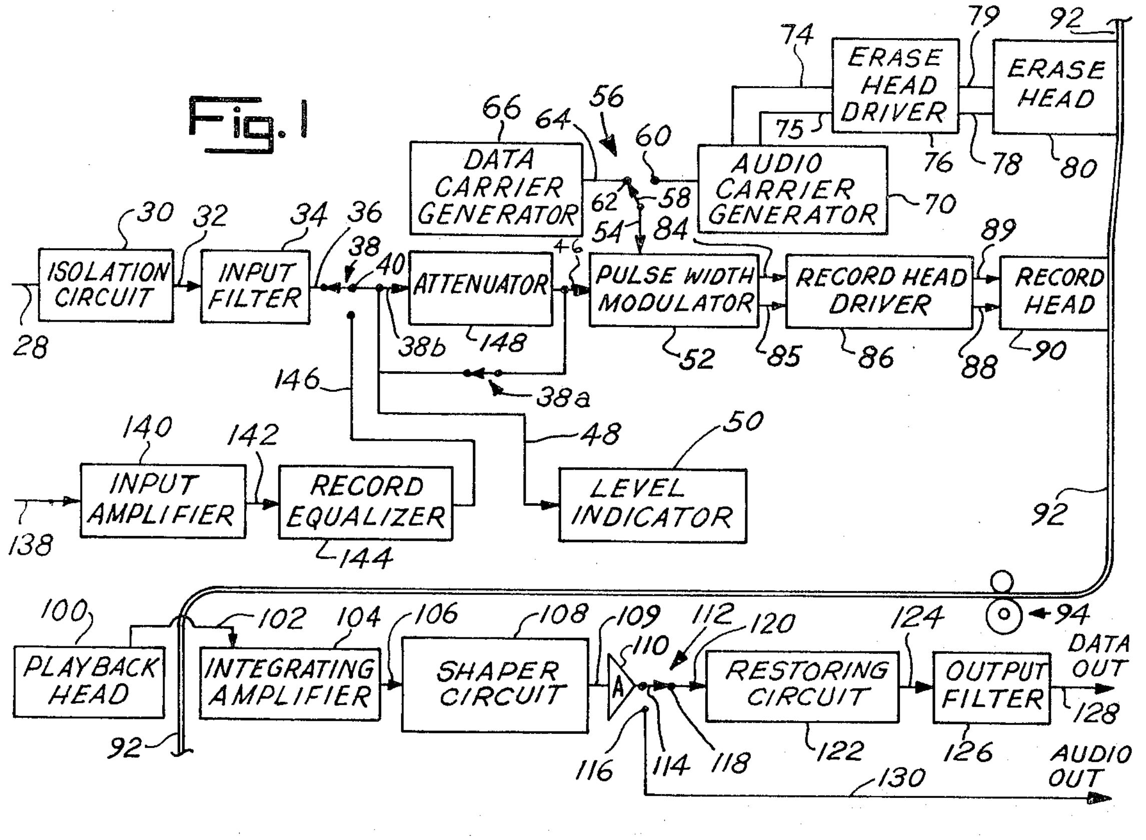
FIG. 1 is a block diagram, schematic drawing of a preferred form of the present invention that is adapted to record both audio and data signals on a magnetic tape.

Referring to FIG. 1, the apparatus used to record data signals (such as signal B in FIG. 19) basically comprises an input conductor 28 that receives data signals from a signal source (not shown), and an isolation circuit 30 that conducts the data signals to an input filter 34 over a conductor 32. The isolation circuit matches the impedance of the signal source to the impedance of the input filter. The output of input filter 34 is connected over a conductor 36, a switch 38, a switch 38a, and a conductor 46 to a pulse width modulator 52. The output of filter 34 is also carried over a conductor 48 to a level detector 50 that indicates the amplitude of the signals. Modulator 52 also receives a triangular-shaped signal (such as signal A in FIG. 19) from a data carrier generator 66 over a conductor 64, a switch 56, and a conductor 54. The modulator combines the triangular-shaped signal from generator 66 and the data signal in order to produce rectangular pulses (such as the pulses identified by the letter C in FIG. 19) having widths corresponding to various amplitudes of the data signal. The rectangular pulses produced by modulator 52 are carried over conductors 84 and 85 to a record head driver 86. In response to the rectangular pulses, driver 86 causes current to be conducted in opposite directions through a record head 90 over conductors 88 and 89. Record head 90 creates a magnetic flux field that magnetizes a recording medium such as a strip of magnetic tape 92. Tape 92 is moved past the record head by a tape transport 94 shown schematically herein. The tape transport is adapted to move tape 92 at speeds of 1⅞, 3¾, or 7½ inches per second (IPS) at the option of an operator.

The apparatus described above provides an accurate method of recording relatively low-frequency data signals such as signals derived from an electrocardiograph. Applicant has discovered that operators of tape recorders designed to record such data frequently find it convenient to also record verbal comments that identify and discuss or interpret the data being recorded. In the past, it has been difficult to provide a pulse width modulation tape recorder capable of such performance since the frequency range that can be accurately recorded through pulse width modulation techniques is substantially smaller than the frequency range of human hearing. Accordingly, the use of pulse width modulation techniques alone resulted in relatively poor audio recording. In order to correct this deficiency, prior art tape recorders generally employ two separate recording channels for the data signals and audio signals to be recorded. In such systems, data is recorded by a pulse width modulation technique and audio signals are recorded by conventional direct recording techniques. As a result, the cost of the overall recorder is significantly increased due to the requisite duplication of circuitry.

Applicant has discovered that audio signals can be recorded over a wide frequency range by a modified direct recording technique in which most of the circuitry normally associated with pulse width modulation techniques is used. Referring to FIG. 1, applicant has discovered that it is possible to record audio signals with considerable accuracy by employing an input amplifier 140 that receives audio signals from an input conductor 138. Input conductor 138, in turn, receives signals from an audio signal source (not shown). The amplified audio signals are carried over a conductor 142 to a record equalizer 144 that provides a response characteristic which compensates for high-frequency losses in recording sensitivity. The equalized audio signals are carried over a conductor 146, a switch 38, and a conductor 48 to level indicator 50. The equalized audio signals are also carried over conductor 38*b* to an attentuator 148 that provides signals within an appropriate voltage range required by the operating characteristics of modulator 52. Thereafter, the audio signals are carried over a conductor 46 to modulator 52.

In the audio mode of operation, modulator 52 receives signals from audio carrier generator 70. Generator 70 provides a triangular-shaped signal similar to the signal supplied by data carrier generator 66. However, generator 70 operates at a much higher frequency (i.e., 100 KHz). The audio signals are pulse width modulated in modulator 52 in order to produce rectangular pulses that operate record head driver 86 in the manner previously described. However, in the audio mode of operation, a waveform modifying capacitor is connected in parallel with record head 90. As a result, the higher frequency harmonics of the square wave pulses are filtered so that the current in the record head substantially equals the sum of the current due to the audio signal and the current due to the fundamental frequency of the audio carrier generator signal. In other words, the capacitor causes the peak value of the current conducted through the record head to vary in proportion to the width of the rectangular pulses. The resulting waveform of the current conducted through the record head substantially resembles the waveform of the current conducted through the record head of a conventional audio tape recorder employing high-frequency AC bias. Since the signal produced by carrier generator 70 has a frequency too high to be effectively recorded on the tape the audio signal is recorded in direct form and only audio signals are reproduced during the playback mode of operation.

By employing circuitry of the type described, audio signals can be recorded with characteristics equivalent to conventional audio recording without providing completely separate audio recording apparatus. As a result, the advantages of both pulse width modulated data recording and direct audio recording may be realized in a reliable and inexpensive manner.

Still referring to FIG. 1, the signal recorded on tape 92 can be erased by properly applying to the tape signals generated by an audio carrier generator 70. The output of generator 70 is connected over conductors 74 and 75 to an erase head driver 76. The erase head driver basically operates in the same manner as record head driver 86 in order to conduct current in opposite directions through erase head 80 over conductors 78 and 79. The current flowing through erase head 80 creates magnetic flux fields in tape 92 that remove any trace of a signal previously recorded on the tape.

Still referring to FIG. 1, the pulses containing data information that are recorded on tape 92 may be played back by moving the tape adjacent a playback head 100. The signals produced by the playback head are carried over a conductor 102 to an integrating amplifier 104 that reconstructs the signals into pulses more nearly resembling those produced by modulator 52. These integrated pulses are then passed through a shaper circuit 108 that further reconstructs the pulses. The shaped pulses are then conducted through an amplifier 110, a switch 112, and a conductor 120 to a restoring circuit 122. Restoring circuit 122 employs novel techniques for restoring the pulses to their original shape. The restored pulses are then carried over a conductor 124 and through an output filter 126 in order to eliminate the carrier frequency, its harmonics and its sidebands so that the resulting data signal on conductor 128 is an accurate reproduction of the original data signal received on conductor 28.

In order to playback audio signals, applicant has found a method of using the same circuitry described above. In the past, tape recorders designed to playback pulse width modulated data signals and direct recorded audio signals have used separate playback circuitry for each type of signal. This design technique results in substantial duplication of circuitry and considerable expense. Applicatnt has discovered that by properly designing integrating amplifier 104 and shaper circuit 108, the same circuitry may be used to reproduce both audio signals and rectangular pulses. Of course, this achievement results in considerable cost savings and circuitry that is less complex and more reliable than analogous prior art devices.

More specifically, recorded signals containing audio information may be played back by moving tape 92 adjacent to playback head 100. The voltage signals induced in head 100 by the movement of tape 92 are then carried to integrating amplifier 104 which provides compensation for the rise in playback head output voltage as frequency increases. The signals are then conducted to shaper circuit 108 that adjusts the amplitude and phase of the signals in various frequency ranges so that the resulting signals amplified in amplifier 110 and carrier over output conductor 130 closely resemble the audio signals originally received on conductor 138.

Recording Apparatus

Figure 2:
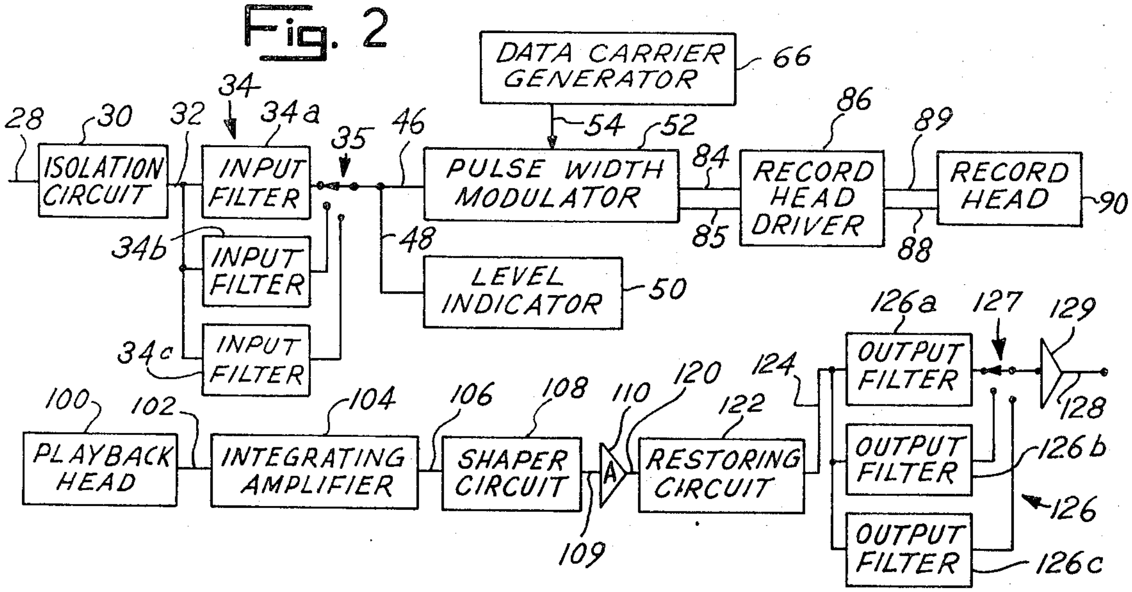
FIG. 2 is a block diagram, schematic drawing of the apparatus of FIG. 1 that is used in order to record and playback data signals.

The specific apparatus interconnected in the data mode of operation by switches 38, 38a, 56, and 112 is illustrated in FIG. 2. The apparatus used to record data signals is shown in more detail in FIGS. 3-8.

Referring to FIG. 2, isolation circuit 30 is provided in order to give the tape recorder a high input impedance and to provide a low impedance driver for input filter 34. Isolation circuit 30 preferably comprises a differential amplifier stage having one input adapted to receive the data signal carried by conductor 28 and a second input adapted to receive a negative feedback signal generated by an additional amplifier stage. The negative feedback signal very nearly equals the magnitude of the input signal so that the gain of isolation circuit 30 is close to unity. The input impedance of the resulting circuit is approximately 1.5 megohms, and the output impedance is less than 100 ohms.

Applicant has discovered that a filter such as input filter 34 is desirable in order to band limit the data signal before modulation in order to eliminate spurious siggals which would occur if higher frequency input signals were allowed to reach modulator 52. Such input signals with frequencies above the signal band, if allowed to reach modulator 52, would produce lower sidebands that fall within the signal band, giving unwanted distortion signals. The input filter prevents the operator of the recorder from attempting to record a signal having a frequency higher than the pass band for which the recorder is designed.

Applicant has found that the ideal pass band of the input filter is dictated by the frequency of the signal produced by the data carrier generator 66. The frequency of the carrier generator, in turn, must be varied depending on the speed at which tape 92 is moved. Accordingly, when a particular tape speed is selected by the operator of the recorder, the signal pass band of the input filter must also be altered. In order to achieve this result, filter 34 comprises filters 34*a*–34*c*, each corresponding to a particular tape speed. The appropriate filter is connected to modulator 52 through a switch 35 at the time the operator selects the tape speed desired.

Applicant has discovered that optimum results are achieved when the tape speed, data carrier signal frequency, and signal pass band of input filters are adjusted according to the following chart:

| Tape Speed | Data Carrier Signal Frequency | Input Filter Pass Band |
|---|---|---|
| 1⅞ IPS | 800 Hz. | 200 Hz. |
| 3¾ IPS | 1600 Hz. | 400 Hz. |
| 7½ IPS | 3200 Hz. | 800 Hz. |

Referring to FIG. 2, the 200, 400, and 800 Hz. pass bands are provided by input filters 34*a*, 34*b* and 34*c*, respectively.

Applicant has found that the input filters used in a pulse width modulation tape recorder must have a moderately flat pass band characteristic and a sharp cutoff slope to allow as wide a signal band as possible. In order to meet this requirement, elliptic function filters are used since they provide the maximum possible cutoff slope for a given complexity. Suitable elliptic function filters that eliminate the need for precision, high-Q, low-frequency inductors can be fabricated in the manner illustrated in FIGS. 3 and 4.

Figure 3:
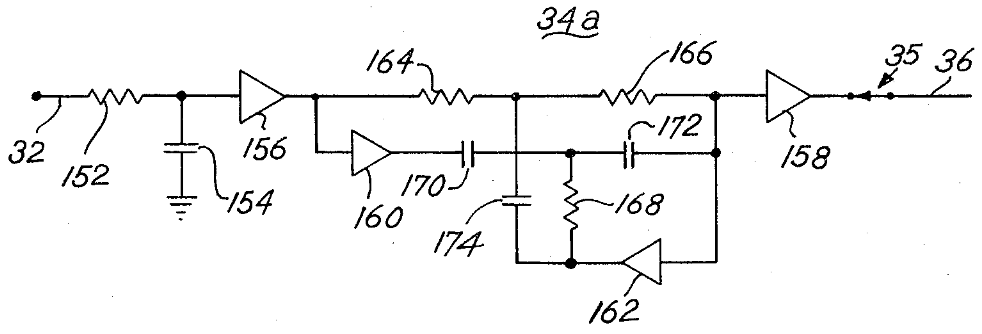
FIG. 3 is a block diagram, schematic drawing of a preferred form of an input filter shown in FIG. 2.
Figure 4:
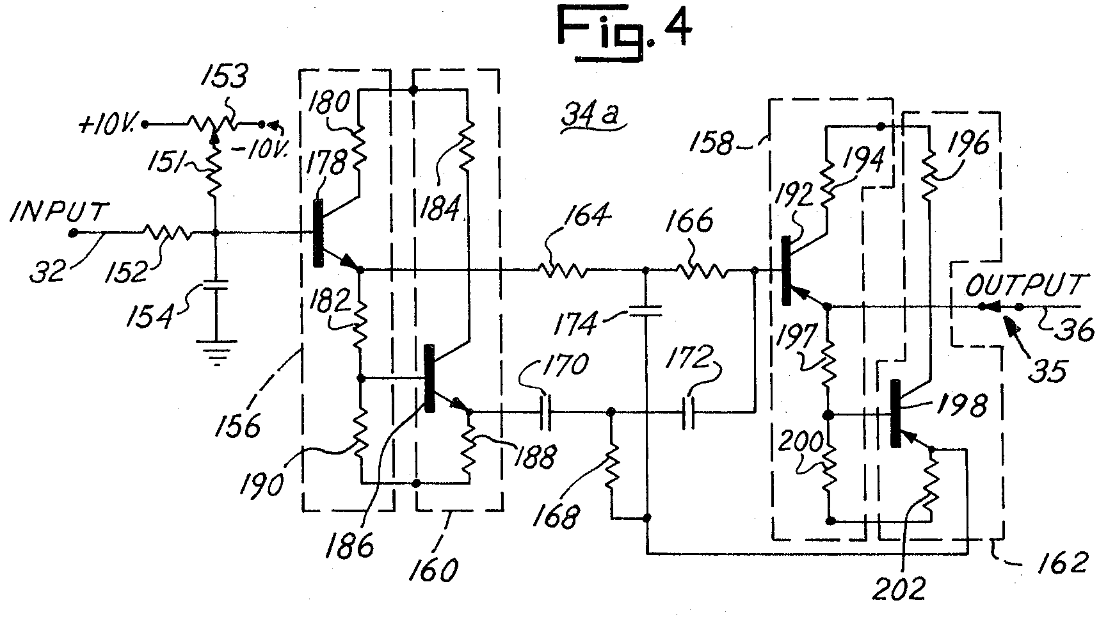
FIG. 4 is a detailed schematic drawing of the apparatus shown in FIG. 3.

FIGS. 3 and 4 illustrate exemplary input filter 34*a*. Input filters 34*b* and 34*c* are constructed in an identical manner but have different component values in order to provide the requisite pass band. As a result, the construction features of filters 34*b* and 34*c* will be readily apparent from the following description of filter 34*a*.

Referring to FIG. 3, input filter 34*a*, in basic form, comprises a single low-pass resistive-capacitive network, including a resistor 152 and a capacitor 154, that is connected to a twin-T active filter. The first T-network comprises series resistors 164, 166 and a parallel capacitor 174. The second T-network comprises series capacitors 170, 172 and a parallel resistor 168. Resistor 164 and capacitor 170 are joined through an isolating emitter follower circuit 160 that has a gain of less than unity. The T-networks are also joined through an isolating emitter follower circuit 162 that has a gain of less than unity. Emitter follower circuits 156 and 158 are also employed for impedance matching purposes.

A practical realization of filter 34*a* is shown in FIG. 4. As illustrated therein, the low-pass resistive-capacitive circuit also comprises a bias resistor 151 and an adjustable resistor 153 that is connected between a positive 10 volt supply and a negative 10 volt supply.

Emitter follower circuit 156 comprises an n-p-n transistor 178, emitter resistors 182 and 190 and a collector resistor 180 that is connected to a positive 10 volt supply. Emitter follower circuit 160 comprises an n-p-n transistor 186, a collector resistor 184 connected to a positive 10 volt supply, and an emitter resistor 188 connected to a negative 10 volt supply. Emitter follower circuit 158 includes a p-n-p transistor 192, a collector resistor 194 connected to a negative 10 volt supply, and emitter resistors 197 and 200. Emitter follower circuit 162 comprises a p-n-p transistor 198, a collector resistor 196 connected to a negative 10 volt supply, and an emitter resistor 202 connected to a positive 10 volt supply.

A filter of the type described in FIG. 4 has a number of advantages. Since emitter follower circuits 156 and 160 use n-p-n transistors whereas emitter follower circuits 158 and 162 use p-n-p transistors, variations of the base-to-emitter voltage drops due to temperature changes can be largely balanced out. Moreover, the resistors of the emitter follower circuits are chosen so that the average current flow is approximately 500 microamps. This relatively low current value limits power consumption to a minimum and reduces noise problems.

Applicant has discovered that filter 34*a* achieves optimum performance when resistor 152 has a value of 20,000 ohms and resistor 166 has a value of 10,000 ohms. At these values, the resistors minimize their loading effect on the emitter follower circuit outputs, while at the same time minimize the loading effect on the resistors by the emitter follower circuit inputs. In order to properly control the amount of stop band attenuation, resistors 182 and 190 preferably have values of 15,000 ohms and 4,700 ohms, respectively. In order to control the height of the transmission peak which occurs just below the upper limit of the pass band of filter 34*a*, resistor 197 and resistor 200 have values of 2,200 ohms and 20,000 ohms, respectively.

It should also be noted that resistor 152 and capacitor 154 are placed in front of, rather than behind, the twin-T active filter in order to keep the signal level as low as possible near the upper edge of the pass band where high signal levels can drive transistor 198 into a nonlinear portion of its operating characteristics.

In order to achieve the proper pass band characteristics, the values of resistors 164 and 166 are equal and the values of capacitors 170 and 172 are equal. In addition, the value of resistor 168 is one-half the value of resistor 166, and the value of capacitor 174 is twice the value of capacitor 170. When resistors 152 and 166 have the values indicated, capacitor 154 has a value of 0.055 microfarads and capacitor 170 has a value of 0.072 microfarads.

As previously mentioned, input filters 34*a* – 34*c* are identical except for the values of certain components thereof. More specifically, filters 34*b* and 34*c* are identical to the above-described filter 34*a* except that the capacitors in filters 34*b* and 34*c* corresponding to capacitor 154 in filter 34*a* have values of 0.028 and 0.14 microfarads, respectively. In addition, the capacitors of filters 34*b* and 34*c* that correspond to capacitor 170 of filter 34*a* have values of 0.036 and 0.018 microfarads, respectively.

Figure 5:
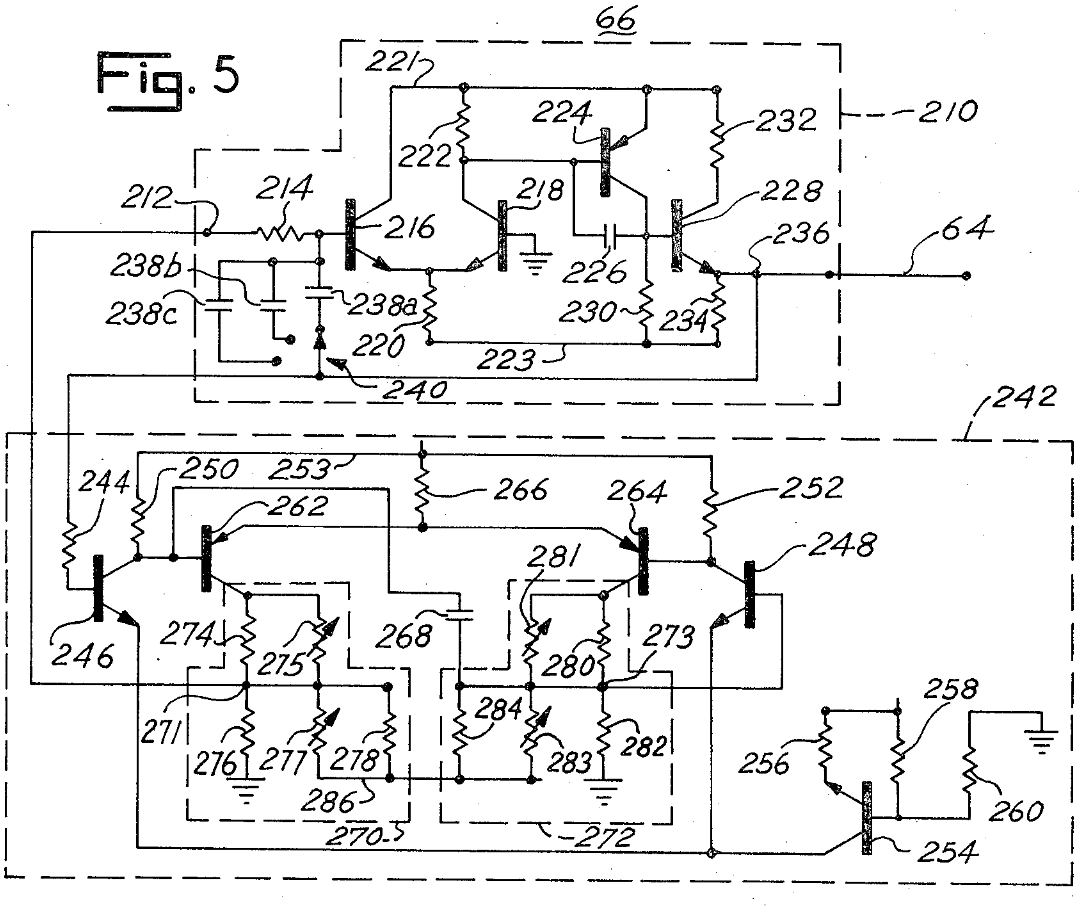
FIG. 5 is a detailed schematic drawing of the data carrier generator shown in FIG. 1.

Referring to FIG. 5, the data carrier generator 66 basically comprises an integrating circuit 210 and a switching circuit 242. More specifically, integrating circuit 210 comprises an input terminal 212 that is connected through a resistor 214 to a difference amplifier comprising transistors 216 and 218. The transistors share a common emitter resistor 220 that is connected to a −10 volt supply conductor 223. The collector of transistor 216 is connected directly to a +10 volt supply conductor 221, and the collector of transistor 218 is connected to conductor 221 through a resistor 222. The collector of transistor 218 is also connected to a single stage amplifier comprising transistor 224. The collector of transistor 224 is connected to the base thereof through a capacitor 226. In addition, the collector of transistor 224 is connected to conductor 223 through a resistor 230 and to the base of a transistor 228. Transistor 228 is connected as an emitter follower amplifier that also includes resistors 232 and 234. The emitter of transistor 228 is connected to an output terminal 236 that, in turn, is connected to the base of transistor 216 through a switch 240 and one of feedback capacitors 238*a* – 238*c*. Those skilled in the art will appreciate that transistors 224 and 228 form a high-gain amplifier that has its output signals centered at 0 volts. Capacitor 226 is included in the circuit to reduce the gain of the amplifier at high frequencies in order to achieve AC stability. If the gain of transistors 224 and 228 is sufficiently large, the operation of integrating circuit 210 approaches that of an ideal integrator so that the application of a positive, constant DC voltage at input terminal 212 causes the voltage on output terminal 236 to decrease at a constant rate that primarily depends on the values of capacitors 238*a* – 238*c*. Likewise, the application of a negative, constant DC voltage to input terminal 212 causes the voltage on output terminal 236 to increase at a constant rate that primarily depends on the values of capacitors 238*a* – 238*c*.

Applicant has discovered that integrating circuit 210 achieves optimum performance when resistors 214, 230, and 234 have values of 20,000 ohms, 4,700 ohms, and 10,000 ohms, respectively, and capacitor 226 has a value of 20 picofarads.

As previously mentioned, the operational rate of data carrier generator 66 varies depending on the speed at which tape 92 is moved through the recorder. Applicant has found that best results are achieved when the generator operates at frequencies of 800 Hz, 1600 Hz, and 3200 Hz for tape speeds of 1⅞ IPS, 3¾ IPS, and 7½ IPS, respectively. In order to make the generator operate at frequencies of 800 Hz, 1600 Hz, and 3200 Hz, capacitors 238*a*, 238*b*, and 238*c* have values of 0.0156 microfarads, 0.0078 microfarads, and 0.0039 microfarads, respectively. Switch 240 is automatically moved to engage the proper capacitor when the operator selects the tape speed of the recorder.

Switching circuit 242 basically comprises a difference amplifier including transistors 246 and 248. Transistors 246 has an input or base terminal connected over a resistor 244 to output terminal 236. Resistor 244 prevents transient signals produced by the operation of circuit 242 from appearing on conductor 64. The collectors of transistors 246 and 248 are connected through resistors 250 and 252, respectively, to a positive 10 volt supply conductor 253. The emitters of transistors 254 and 248 are connected to a constant current source comprising transistor 254 and associated resistors 256, 258 and 260. Transistor 246 is connected to a switching transistor 262, and transistor 248 is connected to a corresponding switching transistor 264. The emitters of transistors 262 and 264 are connected over a common resistor 266 to conductor 253.

The collectors of transistors 262 and 264 are connected to resistive networks 270 and 272, respectively. More specifically, resistive network 270 comprises an output terminal 271 that is connected to input terminal 212 and resistors 274–278. Resistor 276 is grounded and resistors 277 and 278 are connected to a −10 volt supply conductor 286. Resistive network 272 comprises an output terminal 273 and resistors 280–284 that have the same values as resistors 274–278, respectively. In addition, it should be noted that resistor 282 is grounded and resistors 283 and 284 are connected to supply conductor 286.

Capacitor 268 is connected between the base of transistor 262 and resistance network 272 in order to decrease the switching time of circuit 242.

Integrating circuit 210 and switching circuit 242 operate in the following manner. When transistors 246 and 262 are in their nonconductive states, the voltage at terminal 271 is approximately −2 volts. At this time, transistors 248 and 264 are biased in their conductive states so that the voltage at terminal 273 is approximately −2 volts. When switching circuit 242 in the described condition, the voltage applied to input terminal 212 of integrating circuit 210 is approximately −2 volts, and the voltage on output terminal 236 increases at a constant rate primarily determined by the value of resistor 214 and the value of whichever one of capacitors 238*a*–238*c* is connected in the integrating circuit. As long as the voltage at output terminal 236 remains lower than the voltage conducted to the base of transistor 248 (i.e., +2 volts), the voltage produced by integrating circuit 210 continues to increase. When the voltage on output terminal 236 attempts to increase to a value greater than +2 volts, transistors 246 and 262 are switched from their nonconductive to their conductive states, and transistors 248 and 264 are switched from their conductive to their nonconductive states. As a result, the voltage at output terminal 271 is switched from −2 volts to +2 volts, and the voltage at output terminal 273 is switched from +2 volts to −2 volts. When switching circuit 242 is in the foregoing condition, the voltage on input terminal 212 is approximately +2 volts, and the voltage on output terminal 236 begins to decrease at a constant rate depending on the value of resistor 214 and whichever of the capacitors 238*a* – 238*c* is connected in the integrating circuit. When the voltage on output terminal 236 tends to decrease below −2 volts, transistors 248 and 262 are again switched to their nonconductive states, and transistors 248 and 264 are again switched to their conductive states, thereby reestablishing the conditions originally described. According to the foregoing mode of operation, the signal appearing on output conductor 64 is a triangular-shaped wave having peak points of +2 volts and −2 volts and a frequency that is determined by the location of switch 240.

Those skilled in the art will appreciate that the adjustment of resistors 281 and 283 controls the value of the peak points of the triangular-shaped signal, and these resistors should be adjusted so that the peak points are +2 and −2 volts, respectively. Resistors 275 and 277 have an effect on the frequency and symmetry of the triangular-shaped signal and should be adjusted after the peak points have been set. Once resistors 275 and 277 have been adjusted, a triangular-shaped signal having the exact frequency desired may be generated by merely switching one of capacitors 238*a* – 238*c* into the integrating circuit.

The novel circuitry disclosed in FIG. 5 results in the production of a clean, triangular-shaped signal, the frequency and magnitude of which may be easily controlled by the operator. Such a signal is required in a pulse width modulation tape recorder in order to record a data signal at the lowest possible levels of distortion.

Figure 6:
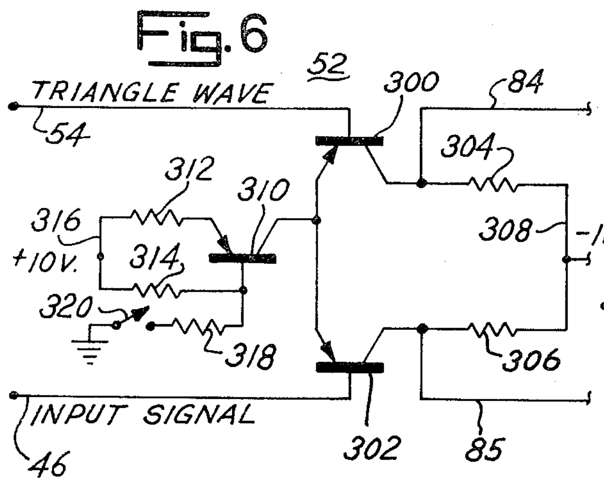
FIG. 6 is a detailed schematic drawing of the pulse width modulator shown in FIG. 1.

Referring to FIG. 6, modulator 52 includes a difference amplifier comprising transistors 300 and 302. The collectors of transistors 300 and 302 are connected through resistors 304 and 306, respectively, to a −10 volt supply conductor 308. The emitters of transistors 300 and 302 are connected to a constant current source comprising a transistor 310 and resistors 312 and 314 that are connected to a +10 volt supply conductor 316. The base of transistor 310 is connected over a resistor 318 and a switch 320 to ground potential. When switch 320 is open, the current through the emitters of transistors 300 and 302 is nearly zero, and the modulator produces no output signal. As a result, no recording takes place. When the switch is closed, the difference amplifier compares the triangular-shaped signal (i.e., signal A in FIG. 19) received over conductor 54 with the data signal (i.e., signal B in FIG. 19) received over conductor 46. Since the triangular-shaped signal varies between +2 and −2 volts, the data signal should be restricted to a range between +1 and −1 volts. As the voltage difference between the triangular-shaped signal and the data signal passes through a zero value, the output of the modulator switches between two equal and opposite levels. More specifically, when the voltage of the triangular-shaped signal exceeds the voltage of the data signal, transistor 302 is switched to its conductive state and transistor 300 is switched to its nonconductive state so that the voltage on conductor 85 is switched to a predetermined maximum value and the voltage on conductor 84 is switched to a predetermined minimum value. When the voltage of the data signal exceeds the voltage of the triangular-shaped signal, transistor 302 is switched to its nonconductive state and transistor 300 is switched to its conductive state so that the value of voltages on conductors 84 and 85 is reversed. That is, the voltage on conductor 84 is switched to the predetermined maximum value and the voltage on conductor 85 is switched to the predetermined minimum value.

The foregoing mode of operation produces a series of pulses (i.e., the pulses identified by the letter C in FIG. 19) on each of conductors 84 and 85. The pulses have widths corresponding to the amplitude of the data signal received on conductor 46. Those skilled in the art will appreciate that the modulator illustrated in FIG. 6 is extremely rugged and reliable and is less susceptible to various inaccuracies when compared with prior art pulse width modulators such as bistable multivibrator circuits.

Figure 7:
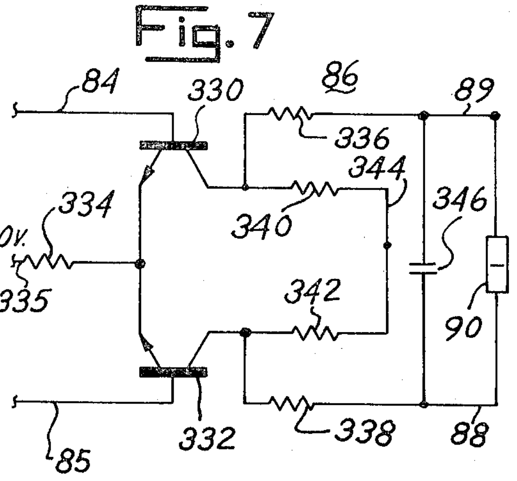
FIG. 7 is a detailed schematic drawing of the record head driver shown in FIG. 1.
Figure 8:
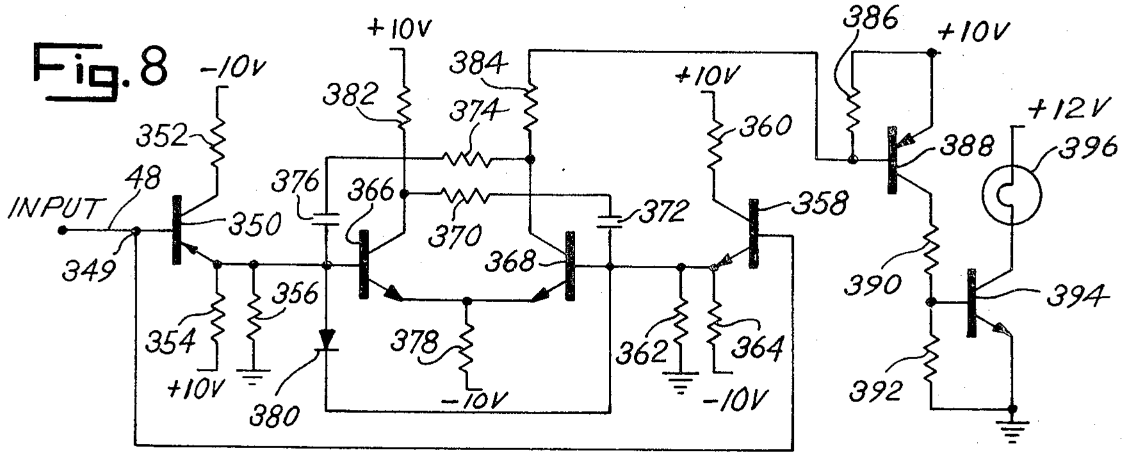
FIG. 8 is a detailed schematic drawing of the level indicator shown in FIG. 1.

Referring to FIG. 7, record head driver 86 basically comprises a switch transistor 330 having a collector connected through a resistor 336 to one terminal of record head 90, and another switch transistor 332 having a collector connected through a resistor 338 to the opposite terminal of record head 90. The emitters of transistors 330 and 332 are connected through a common resistor 334 to a −10 volt supply conductor 335. Power is supplied to transistors 330 and 332 from a +10 volt supply conductor 344 through resistors 340 and 342, respectively. A 150 picofarad capacitor 346 is connected in parallel with record head 90. As will be discussed in more detail later herein, during the audio mode of operation capacitor 346 alters the waveform of the current applied to record head 90. However, during the data mode of operation, capacitor 346 has little effect on the operation of the record head, due to the lower frequencies produced by the data generator.

The arrangement of components shown in FIG. 7 provides rapid transition between two record current levels which are equal in magnitude but opposite in direction. The connection of conductors 84 and 85 to the bases of transistors 330 and 332, respectively, provides means for driving the transistors in phase opposition so that one transistor is in its conductive state as the other transistor is in its nonconductive state. More specifically, when transistor 332 is in its nonconductive state, current flows from supply conductor 344 through resistors 342 and 338, record head 90, resistor 336, the collector-emitter junction of transistor 330, and resistor 334 to supply conductor 335. Conversely, when transistor 330 is in its nonconductive state, current flows from supply conductor 344 through resistors 340 and 336, record head 90, resistor 338, the collector-emitter junction of transistor 332, and resistor 334 to supply conductor 335. Since resistors 336 and 338 are equal in value and resistors 340 and 342 are equal in value, the current passed through the record head in either direction has the same magnitude. Moreover, since the maximum available voltage is used, the rate of change of current in record head 90 is the largest value that can be obtained without resorting to the use of expensive and space-consuming transformers. It should also be noted that resistors 336 and 338 preferably have a relatively large value, such as 10,000 ohms, so that the record head is driven by an approximately constant current source.

Record head 90 comprises a four track, four channel head having a gap width of 0.1 mils, a track width of 0.037 inches, and a track spacing of 0.071 inches. The nominal 1000 Hz inductance is 25 millihenries and the resistance is 65 ohms. To minimize high frequency spacing losses and to minimize variability of these losses, the pressure of tape 92 on record head 90 should be relatively large. The pressure depends on the tape tension, the size of the contact area, and the change in the angle of the tape as it passes the record head (i.e., the tape wrap angle). When a record head of the described type is used, the tape wrap angle should be about 20 degrees.

Since modulator 52 is designed to operate in connection with a data signal having a maximum amplitude between +1 volt and −1 volt, it is important to provide a means for indicating whether the magnitude of the data signal is within its prescribed limits. If the data signal exceeds +1 volt or −1 volt, the degree of modulation attained thereby results in substantial distortion. A novel level indicator 50 that provides a positive indication of the magnitude of the data signal is illustrated in detail in FIG. 8. More specifically, an input terminal 349 of level indicator 50 is connected to the base of limiter transistor 350 that has resistors 352, 354, and 356 connected thereto. The input terminal is also connected to the base of limiter transistor 358 that has associated resistors 360, 362, and 364 connected thereto. Resistors 352 and 364 are connected to a −10 volt supply, whereas resistors 354 and 360 are connected to a +10 volt supply. The emitter of transistor 350 is connected to one input of a difference amplifier comprising transistors 366 and 368. The emitter of transistor 358 is connected to another input of the difference amplifier. Transistors 366 and 368 are interconnected through feedback loops. More specifically, the collector or output of transistor 366 is connected through a resistor 370 and a capacitor 372 to the base of transistor 368. Likewise, the collector or output of transistor 368 is connected through a resistor 374 and a capacitor 376 to the base of transistor 366. The emitters of transistors 366 and 368 are connected through a common resistor 378 to a −10 volt supply. In addition, the bases of transistors 366 and 368 are connected through a diode 380. Current is supplied to transistor 366 from a +10 volt supply through resistors 386 and 384 to transistor 368. The collector of transistor 368 is connected through resistor 384 to the base of an amplifying transistor 388. The collector of transistor 388, in turn, is connected through a voltage divider network comprising resistors 390 and 392 to the base of transistor 394.

Transistor 394 controls and drives an indicating means comprising a bulb 396.

Level indicator 50 operates in the following manner. If the data signal impressed on the input terminal of indicator 50 is between +1 and −1 volts, transistors 350 and 358 operate as normal emitter followers. Because of the D.C. offset voltage due to the base-to-emitter voltage drops of transistors 350 and 358, the base voltage of transistor 366 is positive with respect to the base voltage of transistor 368. As a result, transistor 366 conducts a substantial amount of current (but is not saturated) and transistor 368 is in its nonconductive state. Since transistor 368 is in its nonconductive state, transistors 388 and 394 are likewise in their nonconductive states so that bulb 396 is not lighted. As long as bulb 396 remains unlighted, the operator knows that the magnitude of the data signal is within its proper limits.

When the voltage impressed on the input terminal of indicator 50 increases to approximately +1 volt, transistor 358 operates as a normal emitter follower, but the base-emitter junction of transistor 350 is reverse-biased. As a result, the voltage at the base of transistor 366 is determined by the comparative values of resistors 354 and 356, and has its positive excursions limited to a particular D.C. voltage. The voltage at the base of transistor 368 approximately equals the magnitude of the data signal voltage minus a D.C. offset voltage due to the base-to-emitter voltage drop of transistor 358. When the magnitude of the data signal is greater than approximately +1 volt, transistor 368 conducts current. As soon as transistor 368 conducts current, transistors 388 and 394 also conduct current so that light bulb 396 is momentarily lighted.

The conduction of current also decreases the voltage on the collector of transistor 368. This reduction of collector voltage is applied through resistor 374 and capacitor 376 to momentarily decrease the current conducted by switch transistor 366 and to increase the collector voltage thereof. This increase in collector voltage is carried through resistor 370 and capacitor 372 to the base of transistor 368, thereby momentarily maintaining it in its conductive state. Absent the foregoing feature, transistor 368 would revert to its nonconductive state as soon as the data signal voltage decreased below +1 volt. Thus bulb 396 would not normally remain lighted for a sufficiently long period of time to be observed. Applicant has found that by giving resistors 370 and 374 each a value of 100,000 ohms and by giving capacitors 376 and 372 each a value of 0.22 microfarads, transistor 368 can be maintained in its conductive state long enough to provide a positive visual indication by bulb 396, even though the data signal input voltage has a value greater than approximately +1 volt for only a short period of time.

Level indicator 50 operates in an analogous manner if the data signal voltage decreases to approximately −1 volts. In this mode of operation, transistor 350 operates as a normal emitter follower, but the base-emitter junction of transistor 358 is reverse-biased and in a nonconductive state. The voltage at the base of transistor 368 is then determined by the relative values of resistors 362 and 364, and has its negative excursions limited to a particular voltage. The voltage on the base of transistor 366 is approximately the magnitude of the data signal input voltage plus a D.C. offset voltage due to the base-to-emitter voltage drop of transistor 350. When the voltage of the data signal decreases to approximately −1 volts, the voltage on the emitter of transistor 366 decreases sufficiently to cause transistor 368 to begin conducting current, thereby lighting bulb 396. The light bulb is maintained in its lighted condition for a predetermined period of time through the operation of resistors 370, 374 and capacitors 372, 376 in the manner previously described.

The foregoing explanation of the circuit assumed that the voltage of the data input signal basically remained between +1 and −1 volts and only occasionally exceeded those limits for a brief instant. However, the novel arrangement of the circuit elements also enables bulb 396 to be flashed on-and-off even if the voltage of the data signal remains at the +1 or −1 level for a sustained period of time. For example, if the data signal is increased to approximately +1 volt, transistor 368 becomes conductive so that the voltage at its collector is reduced. The reduced voltage is carried through resistor 374 and capacitor 376 so that the current conducted by transistor 366 is momentarily reduced. As a result, the voltage at the collector of transistor 366 is increased and is carried through resistor 370 and capacitor 372 to the input of transistor 368. As the voltage conducted through capacitors 372 and 376 decays, the voltage at the collector of transistor 368 increases, thereby increasing the current conducted by transistor 366. As a result, the voltage at the collector of transistor 366 momentarily decreases so that transistor 368 is returned to its nonconductive state. However, as soon as the current conducted by transistor 368 is reduced, the voltage at its collector is again increased so that the cycle is repeated. Every time transistor 368 conducts current, transistors 388 and 394 are also switched to their conductive states so that bulb 396 is periodically lighted (i.e., flashes on-and-off).

The circuit operates in an analogous manner when the voltage of the data signal is maintained at approximately −1 volt. Those skilled in the art will appreciate that the frequency at which bulb 396 is lighted increases as the voltage of the data signal increases above +1 volt or decreases below −1 volt. When the voltage of the data signal exceeds approximately +1.5 volts or decreases below approximately −1.5 volts, lamp 369 remains lighted continuously. As a result, the operator has a flashing indication when the upper limits of acceptable data signal voltage are reached and a continuous indication when the data signal voltage substantially exceeds an acceptable level.

In the foregoing mode of operation, diode 380 limits the voltage which can appear across its terminals in the forward direction during the regenerative switching action. This operation prevents current flow from emitter-to-base in transistors 350 and 358 which would place a load on the data signal. Since diode 380 has a forward voltage drop of about 0.5 volts when conducting, it allows a difference in voltage between the bases of transistors 366 and 368 that is sufficient to enable the above-described operation. Applicant has also found that the foregoing mode of operation is best achieved when resistors 356 and 362 have a value of 100,000 ohms, and resistors 354 and 364 have a value of 1.2 megohms and 1.5 megohms, respectively.

The portion of the audio recording apparatus that are independent of the data recording apparatus will now be described in greater detail. The circuitry interconnected by switches 38, 56, *m*, and 112 in the audio mode of operation is shown in FIG. 9.

Input amplifier 140 (FIG. 9) may comprise a variety of suitable amplifying circuits that provide a relatively high input impedance (e.g., 1 megohm) and that are capable of amplifying audio signals to voltage levels of 1 to 2 volts.

Figure 9:
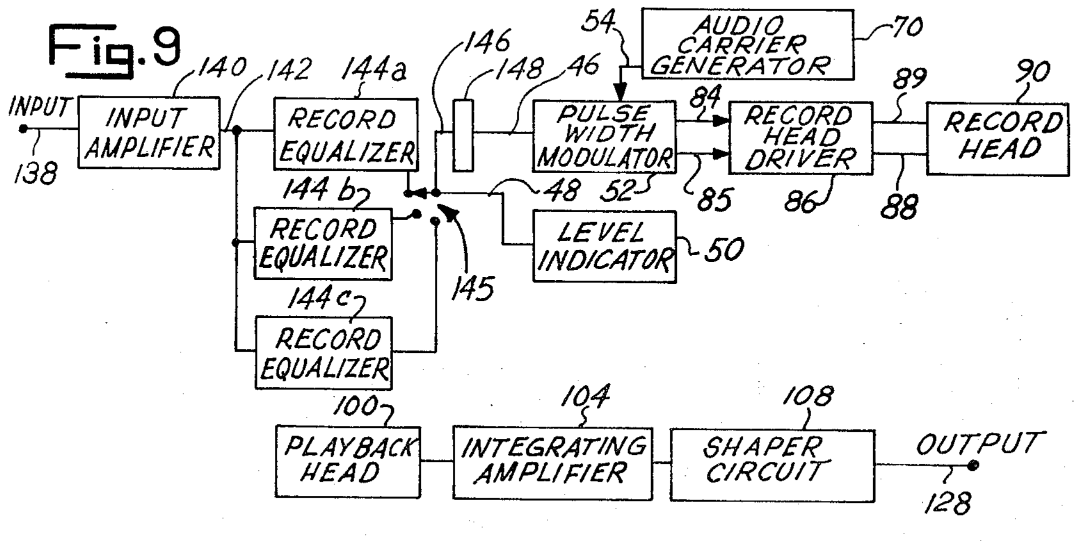
FIG. 9 is a block diagram, schematic drawing of the apparatus shown in FIG. 1 that is used to record and playback audio signals.
Figure 10:
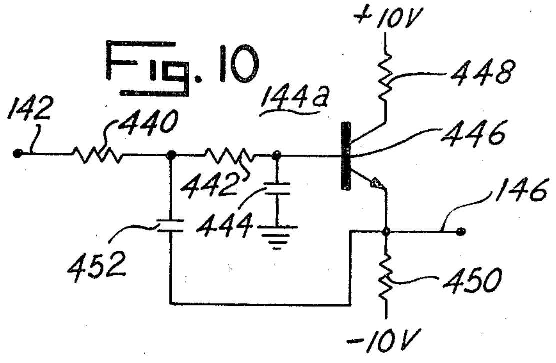
FIG. 10 is a detailed schematic drawing of the record equalizer shown in FIG. 1.

In connection with FIG. 9, it should be noted that record equalizer 144 actually comprises three separate record equalizers 144*a*, 144*b*, and 144*c* that are used in connection with tape speeds of 1⅞ IPS, 3¾ IPS, and 7½ IPS, respectively. The appropriate record equalizer is selected by a switch 145 that is automatically moved to the proper position by the selection of a tape speed by the operator. Each of the record equalizers 144*a* – 144*c* is identical except for the value of certain capacitors used therein, and each may be understood with reference to the detailed description of equalizer 144*a* in FIG. 10. Record equalizer 144*a* basically comprises an input resistor 440 and an input filter comprising a resistor 442 and a capacitor 444. The equalizer also includes a transistor 446 having its collector connected through a resistor 448 to a positive 10 volt supply. The emitter of transistor 446 is connected to output conductor 146 and is also connected to a feedback network comprising a resistor 450 and a capacitor 452. Resistor 450 is also connected to a negative 10 volt supply.

Record equalizer 144a produces a peak of approximately 6 db in the range of frequencies in which recording sensitivity begins to decrease. This characteristic partially compensates for record-playback losses. Applicant has found that record equalizer 144*a* operates in the manner indicated when resistors 440, 442 and 450 have values of 10,000 ohms, 10,000 ohms, and 20,000 ohms, respectively, and capacitors 452 and 444 have the values of 0.010 microfarads and 390 microfarads, respectively. As previously indicated, record equalizers 144*b* and 144*c* are constructed in the same manner as equalizer 144*a*, and the resistors therein have identical values. However, the capacitors in equalizers 144*b* and 144*c* that correspond to capacitor 452 preferably have values of 0.0047 and 0.0031 microfarads, respectively. In addition, the capacitors of equalizers 144*b* and 144*c* that correspond to capacitor 444 preferably have values of 150 and 68 microfarads, respectively.

Referring to FIG. 9, attenuator 148 may comprise an ordinary resistive circuit that reduces the magnitude of the audio signal voltage to an appropriate level. The attenuator also includes a capacitor that AC couples the audio signal to modulator 52. An adjustable resistor connected to a source of positive voltage may also be used in the attenuator in order to adjust the DC level of the modulator for minimum even harmonic distortion.

Figure 11:
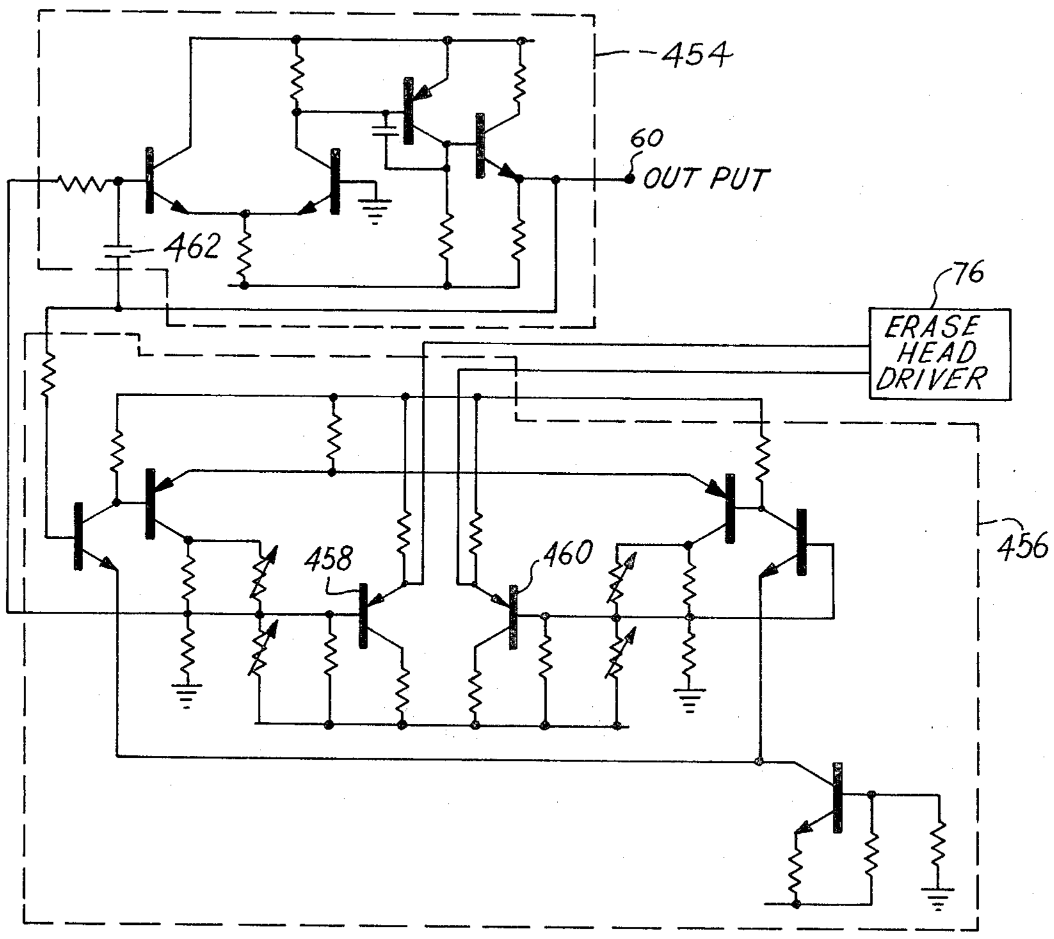
FIG. 11 is a detailed schematic drawing of the audio carrier generator shown in FIG. 1, together with the manner in which the audio carrier generator is interconnected with the erase head driver.

Referring to FIG. 11, audio carrier generator 70 is shown in detail. Generator 70 is essentially the same as data carrier generator 66 and may be understood with reference to the description thereof in connection with FIG. 5, Basically, generator 70 comprises an integrating circuit 454 and a switching circuit 456. The main differences between the two generators may be summarized as follows. In generator 66, capacitors 238*a* – 238*c* are selected by a switch 240 depending on the tape speed employed. Capacitors 238*a* – 238*c* range in value from 0.0156 to 0.0039 microfarads and result in an output signal frequency ranging from 800 to 3200 Hz. In place of capacitors 238*a* – 238*c*, carrier generator 70 employs a single capacitor 462 that has a value of 100 picofarads. As a result, generator 70 produces a triangular-shaped output signal having a frequency of approximately 100,000 Hz. Capacitor 268 is omitted in generator 70, since it is not useful at frequencies of approximately 100,000 Hz. Transistors 458 and 460 are employed in generator 70 in order to provide output signals that drive the erase head driver 76.

Playback Apparatus

Signals recorded on tape 92 by the apparatus described above may be played back by moving tape 92 past playback head 100 at the same speed at which the signals were recorded, or at a different speed if time scale expansion or compression of the recorded signal is desired. Playback head 100 preferably comprises a four track, four channel head having a gap width of 0.1 mils, a track width of 0.037 inches, and a track spacing of 0.071 inches. The nominal 1,000 Hz inductance of playback head 100 is preferably about 90 millihenries, and the resistance is preferably about 220 ohms.

Figure 19:
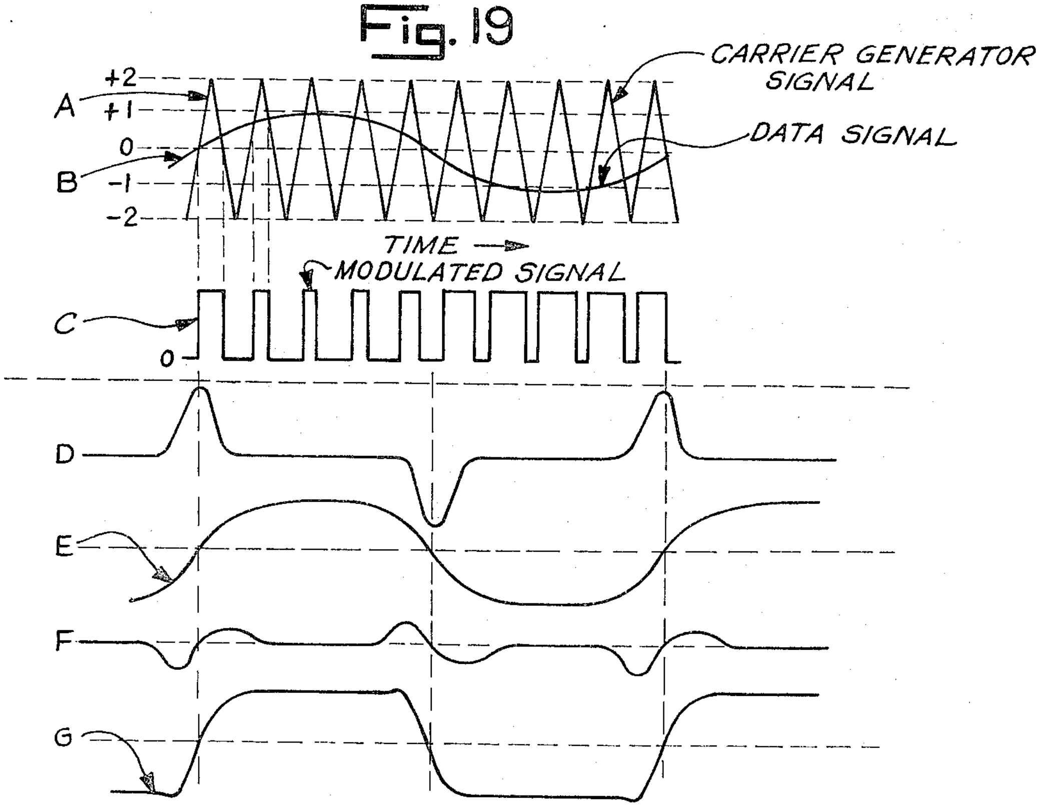
FIG. 19 is a drawing of voltage signal waveforms generated at various points in the apparatus shown in FIG. 1.

Playback head 100 is designed to be used to receive both recorded pulses during data reproduction and recorded audio signals during audio reproduction. The voltage produced by playback head 100 is proportional to the time derivative of the magnetic flux passing through its core so that its basic sensitivity increases at the rate of 6 db per frequency octave. When data signals are reproduced, the recorded rectangular pulses are differentiated by the operation of the playback head so that pulses of the type identified by the letter D in FIG. 19 are produced. In order to reconstruct the rectangular pulses, the differentiated pulses are integrated by integrating amplifier 104. The rectangular pulses are further restored by shaper circuit 108 to produce pulses of the type identified by the letter G in FIG. 19. When recorded audio signals are played back, integrating amplifier 104 corrects for the 6db per octave increase in the basic sensitivity of playback head 100. In addition shaper circuit 108 corrects for frequency dependent playback losses. Applicant has discovered that by properly designing integrating amplifier 104 and shaper circuit 108, the same circuitry may be used to play back both recorded audio and data signals. Of course, this achievement provides a considerable cost saving and results in circuitry that is less bulky and more reliable than analogous prior art devices.

Figure 12:
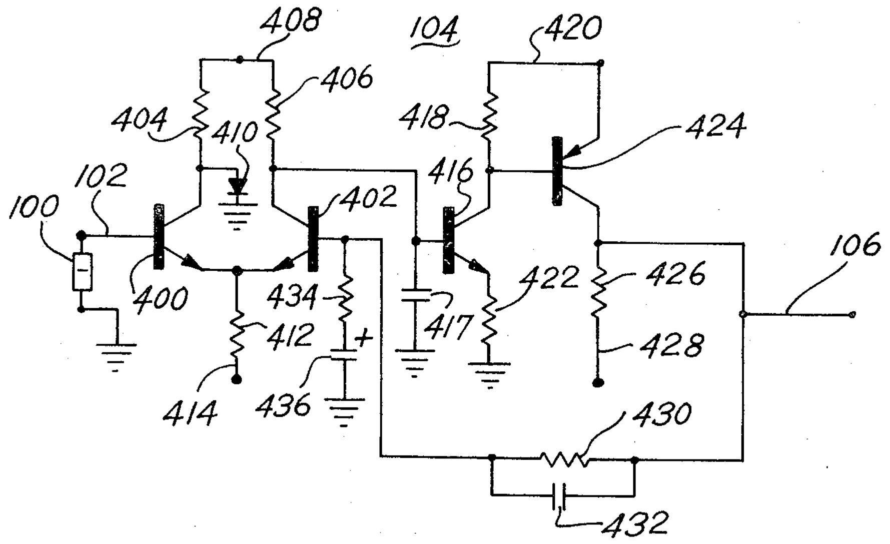
FIG. 12 is a detailed schematic drawing of the integrating amplifier shown in FIG. 1.

An embodiment of integrating amplifier 104 that achieves the foregoing objectives, and in addition, eliminates loading of the playback head output signal and substantially elminates the introduction of noise is illustrated in detail in FIG. 12. In addition, amplifier 104 compensates for the frequency dependence of the basic transducer ratio of the playback head. Integrating amplifier 104 includes a difference amplifier comprising transistors 400 and 402. The collectors of transistors 400 and 402 are connected through resistors 404 and 406, respectively, to a positive voltage supply conductor 408. Conductor 408, in turn, is connected through a capacitive-resistive decoupling circuit (not shown) to a +10 volt supply. The collector of transistor 400 is also connected to ground potential through a diode 410. The emitters of transistors 400 and 402 are connected through a common resistor 412 to a negative voltage supply conductor 414. Conductor 414, in turn, is connected through a capacitive-resistive decoupling circuit (not shown) to a −10 volt supply. The output of the difference amplifier (i.e., the collector of transistor 402) is connected to the base of an amplifying transistor 416 and over a capacitor 417 to ground potential. The collector of transistor 416 is connected to the base of another amplifying transistor 424 and through a resistor 418 to a positive voltage supply conductor 420. Conductor 420, in turn, is connected through a resistive-capacitive decoupling circuit (not shown) to a +10 volt supply. Resistor 422 is connected from ground potential to the emitter of transistor 416 so that capacitor 417 may more effectively reduce the high-frequency, open-loop gain in order to provide increased stability. The collector of transistor 424 is connected to output conductor 106 and over a resistor 426 to a negative voltage supply conductor 428. Conductor 428, in turn, is connected over a capacitive-resistive decoupling circuit to a −10 volt supply. The collector of transistor 424 is also connected over a feedback circuit to one input of the difference amplifier (i.e., to the base of transistor 402). The feedback network comprises resistors 430, 434 and capacitors 432, 436. A second input to the difference amplifier, of course, receives signals from the playback head over conductor 102. The feedback network provides a large amount of D.C. feedback to stabilize the operating bias of the amplifier. For signals having higher frequencies (i.e., 20 Hz to 100,000 Hz) the amount of feedback is primarily determined by capacitor 432 and resistor 434. This arrangement results in a transfer function that corresponds to that of an integrator. As a result, the pulses produced by the playback head 100 are integrated to form signals of the type identified by the letter E in FIG. 19. It can be readily seen that these integrated signals more nearly resemble the pulses originally recorded than the pulses produced by the playback head. Moreover, due to the arrangement of components in the integrating amplifier and by selecting proper values thereof, integrating amplifier 104 provides a minus 6 db per octave frequency response characteristic that is essential for the accurate reproduction of recorded audio signals. As a result, both data and audio signals may be appropriately processed by the same circuitry.

In order to achieve the foregoing results, the components comprising integrating amplifier 104 have the values identified in the following chart.

INTEGRATING AMPLIFIER COMPONENT VALUE CHART

Resistor 404 — 47,000 ohms
Resistor 406 — 100,000 ohms (low-noise type)
Resistor 412 — 50,000 ohms (low-noise type)
Resistor 418 — 4,700 ohms
Resistor 422 — 100 ohms (low-noise type)
Resistor 426 — 4,700 ohms
Resistor 430 — 1.0 megohm
Resistor 434 — 100 ohms (low-noise type)
Capacitor 417 — 0.022 microfarads
Capacitor 432 — 0.01 microfarads
Capacitor 436 — 250 microfarads
Transistor 400 — Type 2N3707
Transistor 402 — Type 2N3707
Transistor 416 — Type 2N3707
Transistor 424 — Type 2N3702
Diode 410 — Type 1N456

Although the operation of integrating amplifier 104 considerably improves the shape of the data signals, the transition time during which the signals traverse between the two levels is considerably longer than the corresponding transition time of the recorded pulses. Accordingly, it is desirable to decrease, as much as possible, the transition time of the integrated signals produced by the integrating amplifier. Applicant has learned that a convenient and reliable way of achieving this result is to subtract from the integrated signals a portion of the second derivative thereof.

The manner in which the foregoing method achieves the desired result is shown in FIG. 19. An exemplary signal produced by integrating amplifier 104 is illustrated opposite the letter E in FIG. 19, and the negative of the second derivative thereof is indicated by the letter F. The signal resulting from the subtraction of the second derivative from the original signal is illustrated opposite the letter G.

Figure 13A:
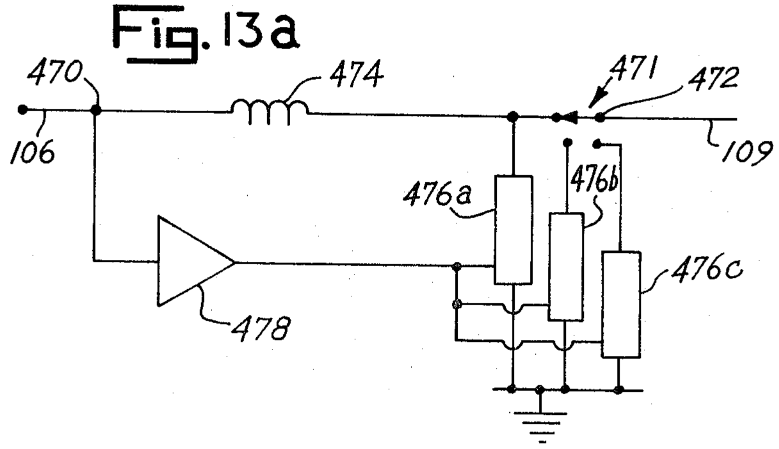
FIG. 13*a* is a block diagram, schematic drawing of the shaper circuit shown in FIG. 1.
Figure 13B:
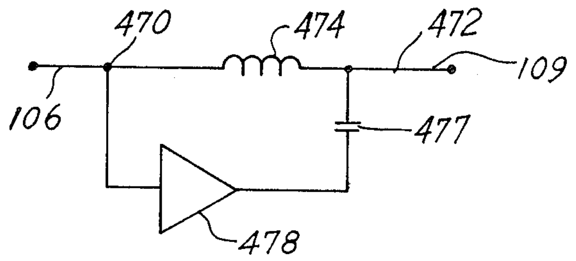
FIG. 13*b* is a simplified drawing of the apparatus shown in FIG. 13*a;*
Figure 14:
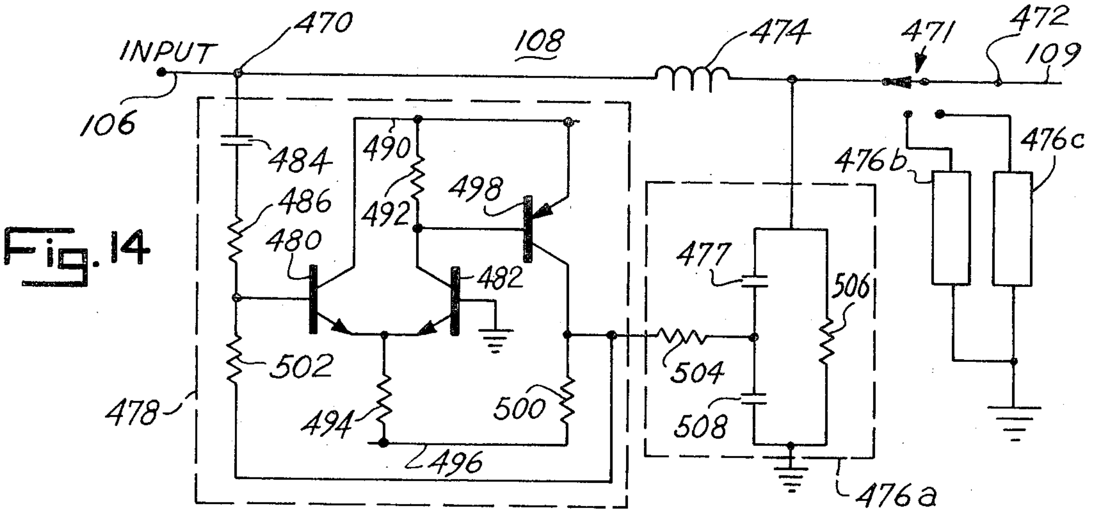
FIG. 14 is a detailed schematic drawing of the apparatus shown in FIG. 13*a;*

The signals produced by integrating amplifier 104 are operated on in the manner indicated in FIG. 19 by shaper circuit 108, a detailed illustration of which is shown in FIGS. 13*a*, 13*b*, and 14. Circuit 108 compensates for frequency dependent losses in the record-playback process.

Referring to FIG. 13*a* shaper circuit 108 basically comprises an input terminal 470, an output terminal 472, an inductor 474 connected between the input and output terminals through a switch 471, a feedback inverting amplifier 478, and resistor-capacitor circuits 476*a*, 476*b*, and 476*c* that are switched into the circuit for use in connection with tape speeds of 1⅞ IPS, 3¾ IPS and 7½ IPS, respectively. Each of the resistor-capacitor circuits is identical except for alterations in component values, and each may be understood with reference to the illustration of resistor-capacitor circuit 476*a* in FIG. 14.

Referring to FIG. 14, feedback amplifier 478 basically comprises a difference amplifier that includes transistors 480 and 482. Transistor 480 is coupled to terminal 470 through a capacitor 484 and a resistor 486. The collector of transistor 480 receives current from a +10 volt supply conductor 490. Current is also received by transistor 482 from conductor 490 through a resistor 492. The emitters of transistors 480 and 482 are connected through a common resistor 494 to a −10 volt supply conductor 496. The output of the difference amplifier is connected to the base of an amplifying transistor 498 that has its collector connected to supply conductor 496 through a resistor 500. The collector of transistor 498 is also connected through a feedback resistor 502 to the base of transistor 480. Resistors 504 and 506 and capacitor 508 are included to damp the shaper circuit and to prevent ringing in the output signal. These components also provide a means for reducing the gain of amplifier 478 with respect to frequencies above the resonant frequency of inductor 474 and capacitor 477 in order to eliminate high frequency noise.

For frequencies well below the resonant frequency of inductor 474 and capacitor 477, the circuitry illustrated in FIG. 14 may be reduced for purposes of explanation to the form shown in FIG. 13*b*. In the circuit of FIG. 13*b*, the current flow through capacitor 477 is approximately proportional to the negative derivative with respect to time of the input voltage. The current flowing through capacitor 477 also flows through inductor 474 and produces a voltage drop that is proportional to the negative second derivative with respect to time of the input voltage. As a result, the second derivative of the input voltage appearing at input terminal 470 is subtracted from said input voltage. This mode of operation reduces the transition time of the shaped signals produced by the integrating amplifier as indicated by waveforms E – G in FIG. 19.

Applicant has discovered that the foregoing mode of operation may be best achieved when the components of resistor-capacitor circuit 476a have the values indicated in the following chart.

| Capacitor | Value | Resistor | Value |
|---|---|---|---|
| **508** | 10,000 mfd. | **504** | 3,300 ohms |
| **477** | 3,000 mfd. | **506** | 10,000 ohms |

As previously mentioned, resistor-capacitor circuits 476*b* and 476*c* comprise the same arrangement of components as resistor-capacitor circuit 476*a* shown in FIG. 14. However, the values of the components are different and are given in the following chart.

| Resistor-Capacitor Circuit | Capacitor corresponding to capacitor **508** | capacitor **477** | Resistor corresponding to resistor **504** | resistor **506** |
|---|---|---|---|---|
| **476***b* | 2,500 mfd. | 750 mfd. | 6,800 ohms | 20,000 ohms |
| **476***c* | 680 mfd. | 180 mfd. | 15,000 ohms | 39,000 ohms |

Applicant has also found that shaper circuit 108 achieves optimum performance when inductor 474 has a value of 0.120 millihenries and resistor 502 has a value of 200,000 ohms.

Aside from the wave-shaping capability of circuit 108 with respect to the reproduction of data signals, applicant has also discovered that the circuit adjusts the frequency response of audio signals in order to provide improved playback accuracy. Shaper circuit 108 provides increased amplification at high frequencies to compensate for frequency dependent losses in the record-playback process. It does this without introducing excessive phase shift so that the circuit provides less phase distortion and better overall transient response to audio signals than would more conventional types of equalizing circuits.

Amplifier 110 may comprise a variety of well-known amplifying devices capable of a gain of about 17 and having high input impedance and low output impedance.

Although the data signals produced by shaper circuit 108 have a waveform closely approximating the shape of the pulses originally recorded, the transition time of the pulses is still not sufficiently short to reproduce the data signal with a high degree of accuracy. It will be remembered that information in a pulse width modulation system is carried by the positions of the modulated pulse transitions relative to each other (i.e., the width of the pulses). When the time duration of these transitions is increased during the playback process, some point on the waveform of the shaped signals (i.e., pulses) must be chosen to represent the precise transition location that was originally recorded. Of course, this characteristic point must be as insensitive as possible to undesired variables of the record-playback process, such as variations of tape sensitivity, tape to record head spacing, and noise. Applicant has discovered that the characteristic point resulting in greatest accuracy in the transition mid-point of the pulse signal waveform produced by shaper circuit 108. Although the above described characteristic point results in great accuracy, it is difficult to determine for a variety of reasons. Firstly, because of the limited low-frequency response of the record-playback process, the shaped pulse signal waveform shifts in voltage level with changes in the degree of modulation, in order to maintain the average value of the negative and positive portions of the waveform equal. Secondly, because of variations in the tape magnetic layer and changes in the tape to record and playback head contact, the amplitude of the pulse signals varies randomly during playback.

In order to avoid the foregoing difficulties, applicant has devised a restoring circuit 122 which is capable of accurately locating the transition mid-point of the signals produced by shaper circuit 108. The restoring circuit then uses the mid-point location in order to generate pulses having transition times comparable to the transition times of the pulses originally recorded. Of course, a circuit of the foregoing type is not necessary for the accurate reproduction of direct recorded audio signals. Accordingly, audio signals are taken from the output of amplifier 110 and are switched to output conductor 130 by switch 112.

Figure 15:
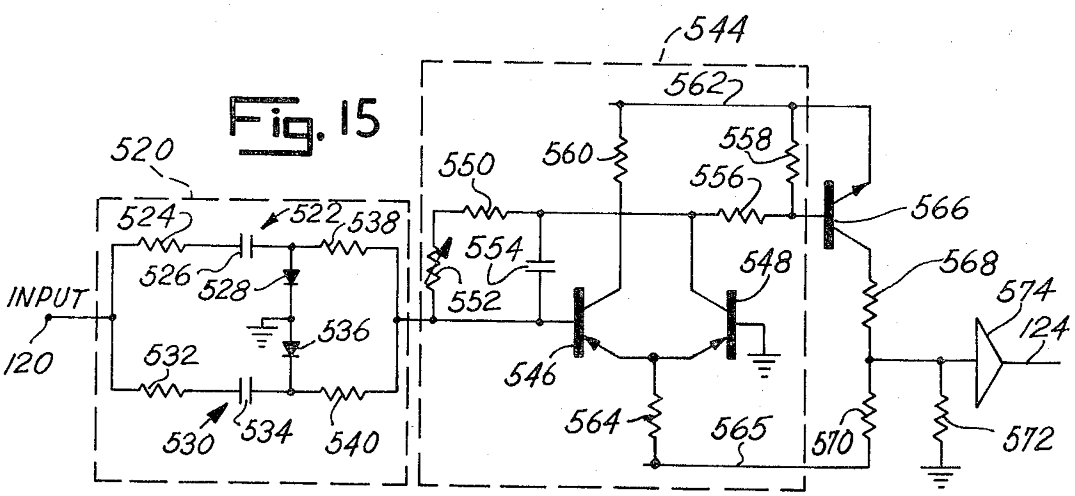
FIG. 15 is a detailed schematic drawing of the restoring circuit shown in FIG. 1.

A detailed illustration of restoring circuit 122 is shown in FIG. 15. The restoring circuit basically comprises a double clamping circuit 520, a zero hysteresis Schmitt trigger circuit 544, a switch transistor 566, and an impedance matching circuit 574.

Double clamping circuit 520 includes a clamping circuit 522 comprising a resistor 524, a capacitor 526, and a diode 528 having its cathode connected to ground potential. The double clamping circuit also includes a clamping circuit 530 comprising a resistor 532, a capacitor 534, and a diode 536, having its anode connected to ground potential. Summing resistors 538 and 540 are included in the circuit in order to sum the signals produced by clamping circuits 522 and 530.

Schmitt trigger circuit 544 basically comprises transistors 546 and 548. The collector of transistor 548 is connected through a feedback circuit comprising resistors 550, 552 and capacitor 554 to the base of transistor 546. The collector of transistor 548 is also connected through resistors 556 and 558 to a −10 volt supply conductor 562. The collector of transistor 546 is connected through a resistor 560 to conductor 562. Transistors 546 and 548 have their emitters connected through a common resistor 564 to a +10 volt supply conductor 565.

Switch transistor 566 has its collector connected through resistors 568 and 570 to conductor 565. The junction of resistors 568 and 570 is connected to impedance matching circuit 574 that provides a means of isolating restoring circuit 122 and driving output filter 126. Resistor 572 is connected between the input of circuit 574 and ground potential.

Double clamping circuit 520 operates in the following manner. In clamping circuit 522, resistor 524 and capacitor 526 pass the input pulses (e.g., the pulses identified by the letter G in FIG. 19) while diode 528 clamps the positive peaks of the pulses at ground potential. In clamping circuit 530, resistor 532 and capacitor 534 also pass the input pulses and diode 536 clamps the negative peaks of the pulses at ground potential. Resistors 538 and 540 then sum the clamped signals such that ground potential is mid-way between the positive and negative peak voltages of the resulting pulses (i.e., the mid-point voltage of each pulse is at ground potential). In other words the summing resistors produce an output signal proportional to the sum of the signal produced by the clamping circuits, such that the output signal exhibits equal positive and negative excursions about a fixed reference level corresponding to the midpoint voltage. Of course, in order to achieve the foregoing mode of operation, corresponding components in clamping circuits 522 and 530 should have equal values, and resistors 538 and 540 should have equal values. Moreover, the time constant of resistor 524 and capacitor 526 should be sufficiently small to provide fast charging of capacitor 526. The time constant of resistor 538 and capacitor 526 should be much larger to provide relatively slow discharge of capacitor 526. However, the latter time constant must be less than the low-frequency time constant of amplifier 110 to allow the double clamping circuit to respond to changes in the level of the input signal mid-point which occur at low modulating frequenices. Applicant has found that the foregoing operational mode may be achieved when the components of double clamping circuit 520 have the values indicated in the following chart.

DOUBLE CLAMPING CIRCUIT 520

Resistor 524 — 1,000 ohms
Resistor 532 — 1,000 ohms
Resistor 538 — 47,000 ohms
Resistor 540 — 47,000 ohms
Capacitor 526 — .1 microfarads
Capacitor 534 — .1 microfarads
Diode 528 — Type 1N90
Diode 536 — Type 1N90

Those skilled in the art will appreciate that transistors 546 and 548 and their associated components form a zero hysteresis Schmitt trigger which changes state as the voltage of the clamped and averaged pulses impressed on the base of transistor 546 pass through ground potential. More specifically, the Schmitt trigger switches to a fixed positive voltage when the voltage of a shaped pulse passes through its mid-point voltage with increasing voltage values, and switches to a fixed negative voltage when the voltage of a shaped pulse passes through its mid-point voltage with decreasing voltage values. This mode of operation substantially reduces the transition time of the pulses and results in a signal (such as waveform H in FIG. 19) that closely resembles the pulses originally recorded. Also, since the amplitude of the pulses is fixed, the output level of the recorder is independent of the sensitivity of the recording medium.

Capacitor 554 increases the rate of the transition between states and also causes the Schmitt trigger circuit to oscillate when an input signal is absent. In this mode of operation, the trigger circuit acts as a squelch oscillator that restores the DC output of the recorder on conductor 128 to ground potential when the tape 92 is stopped. Adjustable resistor 552 is adjusted to give equal on and off times when the trigger circuit acts as a squelch oscillator.

Transistor 566 serves as a switch and resistors 568, 570 and 572 form a voltage dividing network which causes the pulses produced by the Schmitt trigger circuit to be switched between +2 and −2 volts.

In order to reproduce the data signal originally recorded, the pulses produced by restoring circuit 122 are filtered by output filter 126 in order to remove the frequencies introduced by the modulation process. If the filter is sufficiently accurate, these frequencies are removed so that the resulting signal closely resembles the data signal originally received. Referring to FIG. 2, it can be seen that output filter 126 comprises output filters **126*a*, 126*b*, and 126*c* that are used in connection with tape speeds of 1⅞ IPS, 3¾ IPS, and 7½ IPS, respectively. The appropriate output filter is connected in the circuit through a switch 126 when the operator selects the desired tape speed. Basically, output filters 126*a*–126*c* are low-pass filters having the same pass band as input filters 34*a*–34*c* (i.e., 200, 400 and 800 Hz, respectively). Moreover, each of the output filters must attenuate the carrier signal at the pulse repetition frequency to a level at least 60 db below the maximum data signal amplitude. Since the amplitude of the carrier signal is about 8 db above the maximum data signal amplitude, the filter must have a relative attenuation of 70 db at the pulse repetition frequency. Applicant has found that the foregoing design requirements may be met, while at the same time eliminating the need for precision, high-Q, low-frequency inductors by use of output filters of the type disclosed herein. Each of the output filters 126*a*–126*c* is identical except for component values and may be understood with reference to the disclosure of filter 126*a* in FIGS. 16 and 17.**

Figure 16:
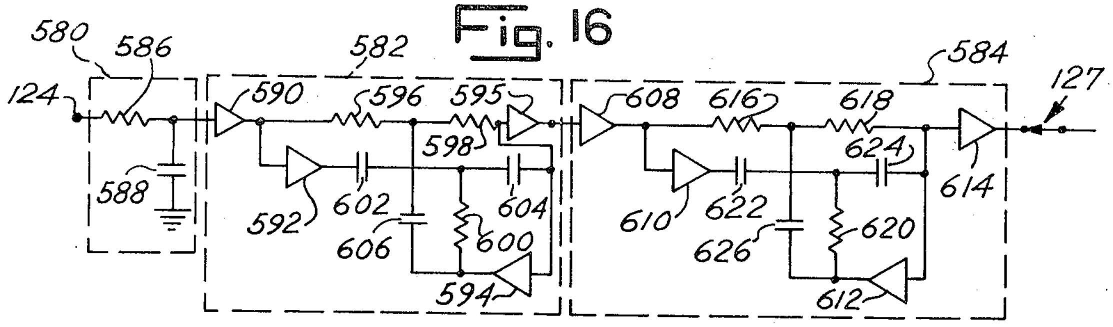
FIG. 16 is a block diagram, schematic drawing of one of the output filters shown in FIG. 2.

Referring to FIG. 16, output filter **126*a* basically comprises a low pass filter 580, and active filters 582 and 584. Filter 580 basically comprises a resistor 586 and a capacitor 588 that is connected to ground potential. Filter 582 basically comprises emitter follower circuits 590, 592, 594, and 595; resistors 596, 598 and 600; and capacitors 602, 604 and 606 arranged in the manner shown. Active filter 584 basically comprises emitter follower circuits 608, 610, 612 and 614; resistors 616, 618 and 620; and capacitors 622, 624, and 626 arranged in the manner shown. It may be observed that output filter 126a comprises a filter of the type shown in FIG. 3 plus an additional active filter. As a result, the construction features and operation of filter 126*a* may be basically understood with reference to the explanation of filter 34*a* (FIG. 3**).

Figure 17:
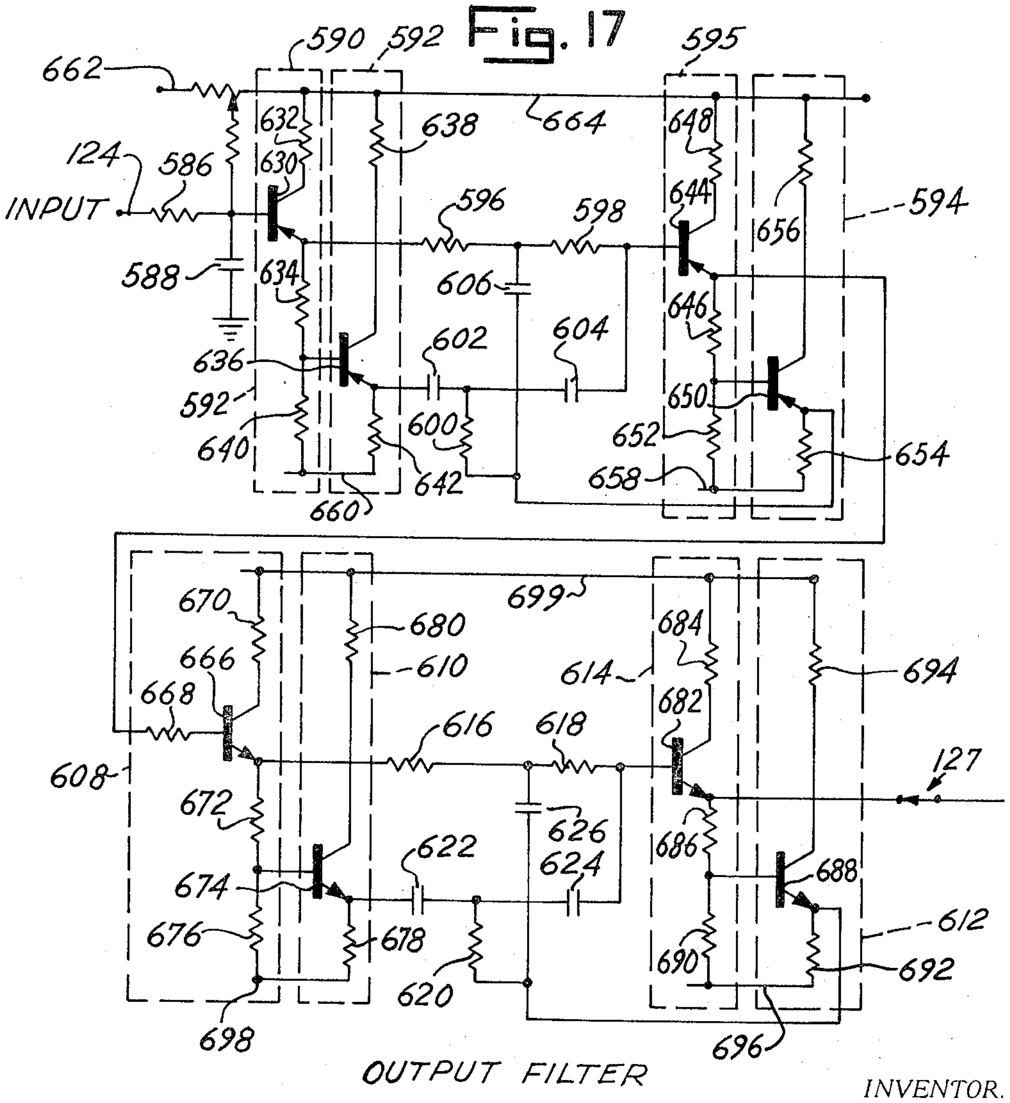
FIG. 17 is a detailed schematic drawing of the output filter shown in FIG. 16.

A detailed disclosure of filter **126*a* is shown in FIG. 17. As illustrated therein, emitter follower circuit 590 basically comprises a transistor 630 and associated resistors 632, 634 and 640. Emitter follower circuit 592 basically comprises a transistor 636 and associated resistors 638 and 642. Likewise, emitter follower circuit 595 comprises a transistor 644 and associated resistors 646, 648 and 652, and emitter follower circuit 594 comprises a transistor 650 and associated resistors 654 and 656. Conductors 658, 660, and 662 are each connected to a +10 volt supply, and conductor 664** is connected to a −10 volt supply.

Regarding active filter 584, emitter follower circuit 608 comprises a transistor 666 and associated resistors 668, 670, 672 and 676. Emitter follower circuit 610 comprises a transistor 674 and associated resistors 678 and 680. Likewise, emitter follower circuit 614 comprises a transistor 682 and associated resistors 684, 686 and 690, and emitter follower circuit 612 comprises a transistor 688 and associated resistors 692 and 694. Conductors 696 and 698 are each connected to a −10 volt supply, and conductor 699 is connected to a +10 volt supply.

It should be noted that resistors 596 and 598 have equal resistances and resistor 600 has a resistance one-half as large as resistor 596. Likewise, resistors 616 and 618 have equal resistances and resistor 620 has a resistance one-half as large as resistor 616. Moreover, capacitors 602 and 604 have equal values and capacitor 606 has a value twice as large as capacitor 602. Likewise, capacitors 622 and 624 have equal values, and capacitor 626 has a value twice as large as capacitor 622. Certain of the resistance values in output filter 126*a* must be carefully chosen. The more critical resistance values used in the circuit are identified in the following chart:

Resistor 596 — 10,000 ohms
Resistor 598 — 10,000 ohms
Resistor 600 — 5,000 ohms
Resistor 616 — 10,000 ohms
Resistor 618 — 10,000 ohms
Resistor 620 — 5,000 ohms
Resistor 634 — 16,000 ohms
Resistor 640 — 3,900 ohms
Resistor 642 — 2,200 ohms
Resistor 646 — 620 ohms
Resistor 652 — 20,000 ohms
Resistor 654 — 20,000 ohms
Resistor 672 — 20,000 ohms
Resistor 676 — 820 ohms
Resistor 678 — 1,000 ohms
Resistor 686 — 3,900 ohms
Resistor 690 — 16,000 ohms
Resistor 692 — 20,000 ohms The resistors in filters 126*b* and 126*c* corresponding to the resistors identified in the foregoing chart have identical values. As in the case of the input filters, the value of certain capacitors used in the output filters is varied in order to provide the required pass bands at each selected tape speed. Accordingly, in output filter 126*a*, capacitors 588, 602, and 622 have values of 0.206, 0.0784, and 0.1104 microfarads, respectively. (The value of capacitors 604, 606, 624, and 626 may be calculated based on the capacitance values given from the foregoing discussion). The values of corresponding capacitors in output filters 126*b* and 126*c* are indicated in the following chart:

| Output Filter | Capacitor Corresponding to Capacitor 588 | Capacitor Corresponding to Capacitor 602 | Capacitor Corresponding to Capacitor 622 |
|---|---|---|---|
| 126*b* | 0.103 μf. | 0.0392 μf. | 0.0552 μf. |
| 126*c* | 0.0515 μf. | 0.0196 μf. | 0.0276 μf. |

Erasing Apparatus

Signals recorded on tape 92 may be conveniently erased by the operation of erase head driver 76 and erase head 80. It will be remembered that erase head driver 76 is operated by isolating transistors 458 and 460 that are connected in audio carrier generator 70 (FIG. 11). The signals produced by transistors 458 and 460 comprise pulses in phase opposition that are carried over conductors 74 and 75 to erase head driver 76.

Figure 18:
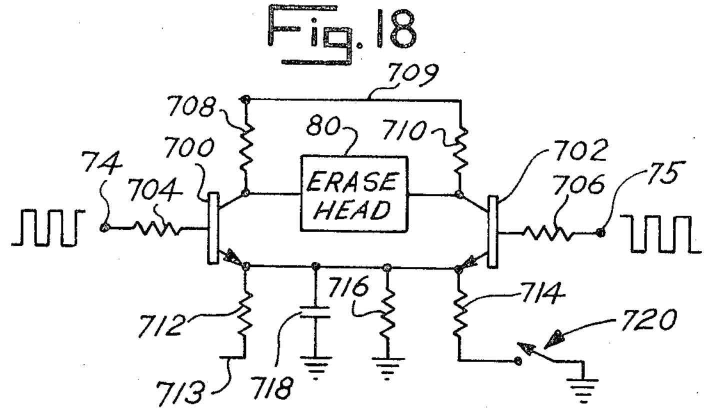
FIG. 18 is a detailed schematic drawing of the erase head driver shown in FIG. 1.

Erase head driver 76 is similar to record head driver 86, and is described in detail in FIG. 18. More specifically, erase head driver 76 comprises switch transistors 700 and 702. The bases of transistors 700 and 702 are connected through resistors 704 and 706, respectively, to input conductors 74 and 75, respectively. The collectors of transistors 700 and 702 are connected over resistors 708 and 710, respectively, to a +50 volt supply conductor 709. The emitters of transistor 700 and 702 are connected over a resistor 712 to a +50 volt supply conductor 713, and over a resistor 714 and a switch 720 to ground potential. The emitters of transistors 700 and 702 are also connected over the parallel combination of resistor 716 and capacitor 718 to a voltage sink maintained at ground potential. A first terminal of erase head 80 is connected to the collector of transistor 700 and a second terminal of erase head 80 is connected to the collector of transistor 702. As a result, resistor 708 provides a current path to the first terminal of erase head 80, and resistor 710 provides a current path to the second terminal of erase head 80.

Erase head driver 76 operates in a manner very similar to record head driver 86 and may be understood with reference to the description thereof. Basically, when transistor 700 is in its nonconductive state, transistor 702 is in its conductive state (and vice versa) due to the phase opposed signals applied to conductors 74 and 75. As a result, whenever switch 720 is closed, current is drawn through erase head 80 in opposite directions at the frequency at which audio carrier generator 70 is operated. The unique design of the driver circuit and its source of phase opposed signals enables current to be drawn through the erase head in each direction for equal periods of time. This feature is important in order to insure complete erasure of all signals from tape 92. When switch 720 is open, the voltage at the emitters of transistors 700 and 702 is held at approximately +4 volts so that the driver is inoperative.

It should be recognized that the apparatus described in connection with FIGS. 1–18 is merely exemplary of the preferred practice of the invention, and that various modifications and alterations of the apparatus and modes of operation may be effected without departing from the spirit and scope of the invention.

What is claimed is:

1. In a recorder, improved apparatus for accurately recording on a recording medium data information occurring over a predetermined bandwidth extending to zero fre-quency in the form of modulated pulses, said apparatus comprising in combination:

input means for receiving data signals containing the data information;

generator means for producing a carrier signal at a carrier frequency;

modulator means comprising a first switch device having a first input terminal, a second input terminal and a first output terminal and comprising a second switch device having a third input terminal, a fourth input terminal and a second output terminal, said first and second switch devices being arranged as a difference amplifier in which the second and fourth input terminals are biased by a common constant current source, the first input terminal is connected to the generator means and the third input terminal is connected to the input means so that the first switch device is switched to a conductive state and the second switch device is switched to a non-conductive state as the magnitude of the data signal exceeds the magnitude of the carrier signal and so that the first switch device is switched to a non-conductive state and the second switch device is switched to a conductive state as the magnitude of the carrier signal exceeds the magnitude of the data signal;

A record head having a first terminal and a second terminal, said record head being adapted to record signals on the recording medium; and driver means connected between said modulator means and said record head, said driver means comprising a first current path extending from a source of voltage to said first terminal, a second current path extending from said source of voltage to said second terminal, a third switch device operatively connected between said first current path and a voltage sink and having an input terminal connected to the first output terminal of the first switch device and a fourth switch device operatively connected between said second current path and a voltage sink and having an input terminal connected to the second output terminal of the second switch device, whereby said modulator means drives said third and fourth switch devices in phase opposition so that current is conducted through the third switch device and through the record head in one direction during a first time period and current is conducted through the fourth switch device and through the record head in the opposite direction during a second time period.

2. In a playback unit, improved apparatus for reproducing over a predetermined bandwidth extending to zero frequency data information signals recorded on a recording medium in the form of width modulated pulses, said apparatus comprising in combination:

a playback head for receiving recorded pulses from the recording medium;

an amplifier connected to said playback head, said amplifier having a frequency response characteristic which compensates for the frequency response characteristic of the playback head;

shaper means connected to said amplifier for subtracting from the amplified pulses a signal corresponding to the second derivative of said amplified pulses to compensate for frequency dependent losses in the record-playback process and thereby to produce shaped pulses more nearly corresponding to the originally recorded pulses;

restoring means connected to said shaper means comprising clamping means for determining the mid-point voltage midway between the maximum and minimum voltages exhibited by each of said shaped pulses and further comprising trigger means for producing one output state when the pulse voltage is greater than the mid-point voltage and for producing a second output state when the pulse voltage is less than the mid-point voltage;

a low pass filter connected to said restoring means for producing a signal corresponding to the original data signal from said restored pulses; and output means connected to said low pass filter for delivering said reproduced data signals.

3. Apparatus, as claimed in claim 2, wherein the clamping means comprises:

a first clamping circuit wherein the positive peaks of the shaped pulses are clamped to a first predetermined DC voltage;

a second clamping circuit wherein the negative peaks of the shaped pulses are clamped to a second predetermined DC voltage; and summing means for producing an output signal proportional to the sum of the signals produced by the first and second clamping circuits such that the output signal exhibits equal positive and negative excursions about a fixed reference level corresponding to the mid-point voltage.

4. Apparatus, as claimed in claim 2, wherein the trigger means is a zero hysteresis bistable trigger network designed to become astable when no signal is present.

5. Apparatus, as claimed in claim 2, wherein said shaper means comprises:

an input terminal and an output terminal;

an inductor connected between the input and output terminals;

an inverting amplifier connected to the input terminal; and a capacitor connected between the output of the inverting amplifier and the output terminal.

6. Apparatus, as claimed in claim 5, wherein shaper means further comprises:

means for damping out resonances and for reducing the gain of the inverting amplifier above a predetermined frequency.

7. In a playback unit, improved apparatus for reproducing over a predetermined bandwidth extending to zero frequency data information signals recorded on a recording medium in the form of modulated pulses, said apparatus comprising in combination:

a playback head for receiving recorded pulses from the recording medium;

an amplifier connected to said playback head, said amplifier having a frequency response characteristic which compensates for the frequency response characteristic of the playback head;

shaper means connected to said amplifier for subtracting from the amplified pulses a signal corresponding to the second derivative of the amplified pulses to produce shaped pulses more nearly corresponding to the originally-recorded pulses;

restoring means for converting said shaped pulses into reproduced signals corresponding to the original data signals; and output means connected to said restoring means for delivering said reproduced signals.

8. Apparatus, as claimed in claim 7, wherein the shaper means comprises:

an input terminal and an output terminal;

an inductor connected between the input and output terminals;

an inverting amplifier connected to the input terminal; and a capacitor connected between the output of the inverting amplifier and the output terminal.

9. Apparatus, as claimed in claim 8, wherein the shaper means further comprises:

means for damping out resonances and for reducing the gain of the inverting amplifier above a predetermined frequency.

10. In a playback unit, improved apparatus for reproducing over a predetermined bandwidth extending to zero frequency data information recorded on a recording medium in the form of modulated pulses, said apparatus comprising in combination:

a playback head for receiving recorded pulses from the recording medium;

first means connected to said playback head for altering the waveform of the playback signals produced by the playback head by compensating for the frequency response characteristic of the playback head and by subtracting from said playback signals a signal corresponding to the second derivative of said playback signals to produce shaped pulses more nearly corresponding to the originally recorded pulses;

restoring means connected to said first means comprising clamping means for determining the mid-point voltage midway between the maximum and minimum voltages exhibited by each of said shaped pulses and further comprising trigger means for producing one output state when the pulse voltage is greater than the mid-point voltage and for producing a second output state when the pulse voltage is less than the mid-point voltage;

second means for converting the restored pulses into reproduced signals corresponding to the original data information; and output means connected to said second means for delivering said reproduced signals.

11. Apparatus, as claimed in claim 10, wherein the clamping means comprises:

a first clamping circuit wherein the positive peaks of the shaped pulses are clamped to a first predetermined DC voltage;

a second clamping circuit wherein the negative peaks of the shaped pulses are clamped to a second predetermined DC voltage; and summing means for producing an output signal proportional to the sum of the signals produced by the first and second clamping circuits such that the output signal exhibits equal positive and negative excursions about a fixed reference level corresponding to the midpoint voltage.

12. Apparatus, as claimed in claim 10, wherein the trigger means is a zero hysteresis bistable trigger network designed to become astable when no signal is present.

13. In a playback unit, improved apparatus for reproducing over a predetermined bandwidth extending to zero frequency data information signals recorded on a recording medium in the form of modulated pulses, said apparatus comprising in combination:

a playback head for receiving recorded pulses from the recording medium;

an amplifier connected to said playback head for producing amplified pulses, said amplifier having a frequency response characteristic which compensates for the frequency response characteristic of the playback head;

shaper means connected to said amplifier for subtracting from the amplified pulses a signal corresponding to the second derivative of said amplified pulses to compensate for frequency dependent loses in the record-playback process and thereby to produce shaped pulses more nearly corresponding to the originally recorded pulses;

restoring means connected to said shaper means comprising clamping means for determining the mid-point voltage between the maximum and minimum voltages exhibited by each of said shaped pulses and further comprising trigger means for producing one output state when the pulse voltage is greater than the mid-pôint voltage and for producing a second output state when the pulse voltage is less than the mid-point voltage;

means for converting the restored pulses into reproduced data signals corresponding to the original data signals; and output means connected to said means for converting in order to transmit the reproduced data signals.

14. In a recorder, improved apparatus for recording audio signals on a recording medium in analog form, comprising in combination:

input means for receiving said audio signals;

generator means for producing a triangle carrier wave at a carrier frequency;

modulator means connected to said generator means and to said input means for producing at an output conductor width modulated rectangular pulses at the carrier frequency;

a record head having a first terminal and a second terminal, said record head being adapted to record signals on a recording medium;

driver means having an input conductor operatively connected to the output conductor of the modulator means, said driver means also having output conductors connected to the first and second terminals of the record head for conducting current through said record head in response to said rectangular pulses; and waveform modifying means connected across the first and second terminals of said record head for causing the peak value of the current conducted through said record head to vary in proportion to the width of said rectangular pulses.

15. Apparatus, as claimed in claim 14, wherein the modulator means comprises a comparator for producing a first output state when the audio signal is greater than the triangle wave and producing a second output state when the audio signal is less than the triangle wave.

16. Apparatus, as claimed in claim 14, wherein the driver means comprises a first switch device operatively connected to the first terminal of the record head and a second switch device operatively connected to the second terminal of the record head, and wherein said modulator means drives said first and second switch devices in phase opposition so that current is conducted through the first switch device and through the record head in one direction during a first time period and current is conducted through the second switch device and through the record head in the opposite direction during a second time period.

17. Apparatus, as claimed in claim 14, wherein the waveform modifying means comprises a capacitor connected in parallel with the record head.

18. In a recorder, improved apparatus for recording audio signals on a recording medium in analog form, comprising in combination:

input means for receiving said audio signals;

modulator means connected to said input means for producing modulated rectangular pulses at a carrier frequency, said carrier frequency being higher than the range of frequencies effectively recorded on the recording medium;

a record head adapted to record signals on the recording medium; and waveform modifying means connected between said modulator means and said record head for attenuating frequencies above the carrier frequency, whereby the envelope of the current conducted through said record head varies in proportion to the width of said rectangular pulses.

19. Apparatus, as claimed in claim 18, wherein the waveform modifying means comprises a capacitor connected in parallel with the record head.

20. In a playback unit, improved apparatus for reproducing audio signals recorded on a recording medium in analog form, said apparatus comprising in combination:

a playback head for receiving recorded signals from the recording medium;

amplifier means connected to said playback head, said amplifier means having a frequency response characteristic with compensates for the frequency dependence of the basic transducer ratio of the playback head;

shaper means connected to said amplifier means for subtracting from the amplified signals another signal corresponding to the second derivative of said amplified signals to compensate for the frequency dependent losses in the record-playback process, thereby producing a more accurate reproduction of said audio signals; and output means connected to said shaper means for delivering said reproduced audio signals.

21. Apparatus, as claimed in claim 20, wherein the shaper means comprises:

an input terminal and an output terminal;

an inductor connected between the input and output terminals;

an inverting amplifier connected to the input terminal; and a capacitor connected between the output of the inverting amplifier and the output terminal.

22. Apparatus, as claimed in claim 21, wherein the shaper means further comprises:

means for damping out resonances and for reducing the gain of the inverting amplifier above a predetermined frequency.

23. In a recorder, improved apparatus for accurately recording on a recording medium data signals occurring over a predetermined bandwidth extending to zero frequency in the form of width modulated pulses and for recording audio signals on a recording medium in analog form, said apparatus comprising in combination:

second input means for receiving the audio signals;

first generator means for producing a first triangle wave carrier signal at a first predetermined carrier frequency;

second generator means for producing a second triangle wave carrier signal at a second predetermined carrier frequency that is higher than the first predetermined carrier frequency;

modulator means connected to said input means;

first switch means for conducting the first triangle wave carrier signal to the modulator means during the recording of data signals in order to produce a first set of width modulated rectangular pulses at the first predetermined carrier frequency;

second switch means for conducting the second triangle wave carrier signal to the modulator means during the recording of audio signals in order to produce a second set of width modulated rectangular pulses at the second predetermined carrier frequency;

a record head having a first terminal and a second terminal, said record head being adapted to record signals on the recording medium;

driver means connected between said modulator means and said record head for conducting current through said record head in response to said width modulated rectangular pulses; and waveform modifying means coupled to said record head for causing the peak value of the current pulses conducted through said record head during recording of audio signals to vary in proportion to the width of each pulse in the second set of width modulated rectangular pulses and for causing the width of the current pulses conducted through said record head during recording of data signals to vary in proportion to the width of each pulse in the first set of width modulated rectangular pulses.

24. Apparatus, as claimed in claim 23, wherein the waveform modifying means comprises a capacitor connected in parallel with the record head.

25. In a playback unit, improved apparatus for accurately reproducing data signals recorded on a recording medium in the form of width modulated pulses and for reproducing audio signals recorded on a recording medium in direct form, said apparatus comprising in combination:

a playback head for receiving recorded signals from the recording medium;

an amplifier connected to said playback head, said amplifier having a frequency response characteristic which compensates for the frequency dependence of the basic transducer ratio of the playback head;

shaper means connected to said amplifier for subtracting from the amplified signal another signal corresponding to the second derivative of said amplified signal to compensate for the frequency dependent losses in the record-playback process, thereby producing a more accurate reproduction of the originally recorded data and audio signals;

audio signal output means connected to said shaper means for delivering reproduced audio signals;

restoring means connected to said shaper means comprising clamping means for determining the mid-point voltage midway between the maximum and minimum voltages exhibited by each of the shaped pulses and further comprising trigger means for producing a first predetermined voltage when the voltage of the shaped pulses is greater than the midpoint voltage and for producing a second predetermined voltage when the voltage of the shaped pulses is less than the midpoint voltage;

a low pass filter connected to said restoring means for producing a signal corresponding to the original data signal from the restored pulses; and data signal output means connected to the low pass filter for delivering reproduced data signals.

* * * * *

PO-1050
(5/69)

UNITED STATES PATENT OFFICE
CERTIFICATE OF CORRECTION

Patent No. 3,797,038 Dated March 12, 1974

Inventor(s) Richard Brander

It is certified that error appears in the above-identified patent and that said Letters Patent are hereby corrected as shown below:

Column 1, in the heading, the assignee is corrected to be -- Beltone Electronics Corporation --, instead of "Bettrone Electronics Corporation".

Signed and sealed this 2nd day of July 1974.

(SEAL)
Attest:

EDWARD M. FLETCHER, JR.
Attesting Officer

C. MARSHALL DANN
Commissioner of Patents